(12) United States Patent
Nishikawa

(10) Patent No.: US 7,791,646 B2
(45) Date of Patent: Sep. 7, 2010

(54) IMAGE PICKUP DEVICE AND CONTROL METHOD THEREFOR

(75) Inventor: Hiroshi Nishikawa, Kawasaki (JP)

(73) Assignee: Canon Kabushiki Kaisha (JP)

( * ) Notice: Subject to any disclaimer, the term of this patent is extended or adjusted under 35 U.S.C. 154(b) by 515 days.

(21) Appl. No.: 11/458,292

(22) Filed: Jul. 18, 2006

(65) Prior Publication Data

US 2007/0030355 A1    Feb. 8, 2007

(30) Foreign Application Priority Data

Jul. 20, 2005    (JP)    ............... 2005-209956

(51) Int. Cl.
*H04N 5/232* (2006.01)
*H04N 5/228* (2006.01)
*H04N 5/225* (2006.01)
*H04N 5/262* (2006.01)

(52) U.S. Cl. ............ 348/211.9; 348/211.4; 348/208.14; 348/169; 348/240.3

(58) Field of Classification Search ............. 348/208.3, 348/208.14, 208.16, 169–272, 211.9, 143–160, 348/207.99–376, 240.3, 211.4; 382/103; 310/68 B; 340/541

See application file for complete search history.

(56) References Cited

U.S. PATENT DOCUMENTS

| 6,404,455 | B1 * | 6/2002 | Ito et al. .................... 348/169 |
| 6,766,035 | B1 * | 7/2004 | Gutta ......................... 382/103 |
| 7,256,817 | B2 * | 8/2007 | Yata .......................... 348/143 |
| 2002/0051057 | A1 * | 5/2002 | Yata .......................... 348/142 |
| 2002/0186970 | A1 * | 12/2002 | Hirano ........................ 396/52 |
| 2003/0048218 | A1 * | 3/2003 | Milnes et al. .......... 342/357.07 |

FOREIGN PATENT DOCUMENTS

JP    7-23271 A    1/1995

* cited by examiner

*Primary Examiner*—Tuan Ho
*Assistant Examiner*—Marly Camargo
(74) *Attorney, Agent, or Firm*—Rossi, Kimms & McDowell LLP

(57) ABSTRACT

A monitoring camera which can realize a tracing function that allows simple tracing of an object. An image shooting unit repeatedly executes a cycle of processing including a shooting processing, an image analyzing processing and a motor driving processing. An image analyzing unit analyzes an image. A motor control unit controls a motor. The monitoring has a first mode of causing the image analyzing unit to obtain a first motor driving target value and causing the motor to start turning during the motor driving processing, and a second mode of obtaining a second motor driving target value based on a motor driving history and causing the motor to start turning in parallel to the image analyzing processing.

17 Claims, 21 Drawing Sheets

FIG. 17A  FIG. 17B  FIG. 17C
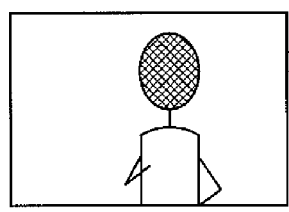
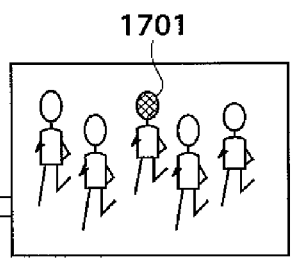
1701
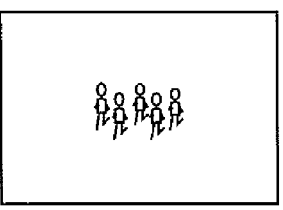
FIG. 17D  FIG. 17E
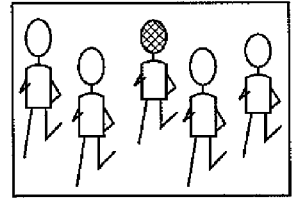
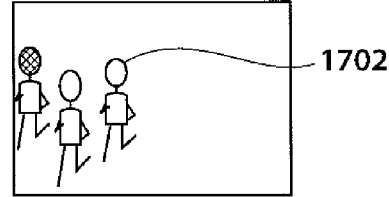
1702

〈TURN 200° BY BRUSHLESS MOTOR: APPROX 1.4 SECOND〉

IMAGE PICKUP DEVICE AND CONTROL METHOD THEREFOR

BACKGROUND OF THE INVENTION

1. Field of the Invention

The present invention relates to an image pickup device such as a video camera and a monitoring camera and to a control method for the image pickup device.

2. Description of the Related Art

Conventionally, image pickup devices such as a video camera and a monitoring camera have been in widespread use which is capable of changing the shooting direction freely by controlling the camera unit by a pan mechanism and a tilt mechanism which are driven by motors, respectively.

For example, while shooting an object of shooting (hereinafter referred to as "an object") with a monitoring camera, if a target object is a human or an animal, generally the operator of the monitoring camera traces the object by an operation of moving the direction of a camera lens while watching the screen of a monitor, but if movement of the direction of the camera lens is too slow or too fast, the object may be lost. Therefore, an automatic tracing function to automatically trace the object is desired to be provided.

Also, while shooting an object by a video camera for example, if movement of a target object changes largely or quickly, it is difficult to manually trace the object. Therefore, an automatic tracing function to automatically trace an object is desired to be provided (for example, refer to Japanese Laid-open Patent Publication (Kokai) No. H07-23271).

Further, for example, while operating a video camera, sometimes it may be troublesome to manually change its zoom magnification. For example, when shooting a scene of a relay race or the like in an athletic festival with a video camera, manually changing the zoom magnification while pressing down a recording button of the video camera causes an object inside a shot image to be unfavorably too big or too small.

Accordingly, an automatic zoom function to automatically adjust the zoom magnification with the traced object as a center is desired, but in the current situation, such a function is not proposed.

In recent years, as a drive source for driving a camera lens or the like, an ultrasonic motor is adopted.

FIG. 22 is a schematic view showing an overall structure of a typical ultrasonic motor.

In FIG. 22, reference numeral 2201 denotes an oscillator comprising piezoelectric elements layered one after the other. Then, by supplying an A-phase signal 2208 and a B-phase signal 2209 as signals having a certain frequency to the oscillator 2201, its resonance generates a mechanical traveling wave in an arrow 2205 direction or in an arrow 2206 direction.

The oscillation of the oscillator 2201 is amplified mechanically by a stator 2202 attached to this oscillator 2201. Then, a rotor 2203 in pressure-contact with the stator 2202 via a rib 2207 turns in the arrow 2205 direction or the arrow 2206 direction in the drawing. This turning of the rotor 2203 is transmitted to a shaft 2204 to generate its turning movement.

A characteristic of the ultrasonic motor having such a structure is a short accelerating/decelerating time during driving.

FIG. 23 is a graph showing a turning speed of a typical brushless motor, in which the abscissa axis and the ordinate axis represent time and the turning speed of the motor, respectively.

In the case of the brushless motor, as shown in FIG. 23, it takes a time of 400 ms to reach a turning speed of 300°/second.

FIG. 24 is a graph showing a turning speed of a typical ultrasonic motor (USM), in which the abscissa axis and the ordinate axis represent time and the turning speed of the motor, respectively.

In the case of the ultrasonic motor, as shown in FIG. 24, the time required for reaching the turning speed of 300°/second is only 20 ms, and thus it can operate with a shorter acceleration/deceleration speed as compared to the brushless motor.

The automatic tracing function as described above is adopted in monitoring cameras or the like which are already commercialized, but the drive motor for a pan mechanism and a tilt mechanism for changing the direction of a camera lens is a brushless DC motor or a stepping motor. Such a motor can accelerate/decelerate only at a low speed, and therefore in the current situation, it cannot respond to quick movement of an object.

Also, since conventional motors are not able to stop quickly, a shooting operation is performed while performing a turning operation as disclosed in Japanese Laid-open Patent Publication (Kokai) No. H07-23271, thereby resulting in a flow of a shot image or the like to deteriorate its image quality.

Further, a camera having an automatic zoom function to control a zoom lens by an ultrasonic motor is commercialized, but a video camera having the automatic zoom function in conjunction with the automatic tracing function as described above does not exist. Accordingly, there has been a complication in operation such that the zoom function has to be controlled by a manual operation while shooting with a video camera.

Also, when the ultrasonic motor is used as it is to drive the pan mechanism, the tilt mechanism or the zoom mechanism, the ultrasonic motor operates at high speed while shooting, which provides a problem that the shot image flows and the image quality deteriorates, thereby disabling the object to be specified when processing an image to specify the object during tracing.

SUMMARY OF THE INVENTION

The present invention is made in view of the above-mentioned problems existing in conventional arts, and an object thereof is to provide an image pickup device and a control method therefor which can realize a tracing function that allows simple tracing of an object.

To attain the above object, in a first aspect of the present invention, there is provided an image pickup device, comprising: an image shooting unit that repeatedly executes a cycle of processing including a shooting processing, an image analyzing processing and a motor driving processing; an image analyzing unit that analyzes an image; and a motor control unit that controls a motor, wherein the image pickup device has a first mode of causing the image analyzing unit to obtain a first motor driving target value and causing the motor to start turning during the motor driving processing, and a second mode of obtaining a second motor driving target value based on a motor driving history and causing the motor to start turning in parallel to the image analyzing processing.

According to this image pickup device, when controlling any one of a pan mechanism, a tilt mechanism and a zoom mechanism using a motor, it is capable of shooting an image during a time in which the motor is stopped or a time in which the motor is in a low speed driving state, thereby improving the image quality during the shooting processing, and increasing a recognition rate of an object during image analysis.

Also, according to this image pickup device, there is provided the second motor driving mode of causing the motor to start turning in parallel to the image analyzing time, whereby it is possible to respond to rapid movement of an object.

Preferably, the image pickup device further comprises a target value calculating unit that obtains the second motor driving target value based on a plurality of motor driving histories.

Preferably, the image pickup device further comprises a target value changing unit that changes, after the motor starts turning in the second mode, the second motor driving target value to the first motor driving target value obtained by the image analyzing unit.

Preferably, a driving start time calculating unit that obtains a driving start time of the motor based on one or more motor driving histories when the motor starts turning by the second mode.

Preferably, the motor is an ultrasonic motor.

Preferably, the image analyzing unit includes a tracing device that traces an object of shooting.

Preferably, the image pickup device further comprises an automatic zoom mechanism that controls a lens unit of the image pickup device automatically.

Further, according to this image pickup device, there are provided the tracing function that traces an object and the automatic zoom function that controls the zoom mechanism automatically, which eliminates the need for a manual zoom operation during image shooting to thereby make a complicated operation unnecessary.

Preferably, the motor control device sets a driving frequency of the motor higher in a low speed driving processing state than a driving frequency of the motor in a high speed driving processing state.

Preferably, the motor control device sets a pulse width of a drive signal for the motor shorter in a low speed driving processing state than in a high speed driving processing state.

Preferably, the motor control device sets a phase difference of a plurality of drive signals for the motor smaller in a low speed driving processing state than in a high speed driving processing state.

Preferably, the image analyzing unit has a zoom magnification changing unit that, when detecting a target object of tracing, changes a zoom magnification of a zoom mechanism that controls a lens unit of the image pickup device as necessary.

Preferably, the image pickup device further comprises an object detecting unit that detects a target object of tracing, and an object changing unit that changes a target object of tracing by an operation of the object detecting device.

Preferably, the image pickup device further comprises an image obtaining unit that obtains an image including an object, and a zoom magnification changing unit that changes a zoom magnification of an image depending on the size of the object.

To attain the above object, in a second aspect of the present invention, there is provided a method for controlling an image pickup device, comprising: an image shooting step of repeatedly executing a cycle of processing including a shooting processing, an image analyzing processing and a motor driving processing; an image analyzing step of analyzing an image; and a motor control step of controlling a motor, wherein the method has a first mode of causing the image analyzing step to obtain a first motor driving target value and causing the motor to start turning during the motor driving processing, and a second mode of obtaining a second motor driving target value based on a motor driving history and causing the motor to start turning in parallel to the image analyzing processing.

The above and other objects, features, and advantages of the invention will become more apparent from the following detailed description taken in conjunction with the accompanying drawings.

BRIEF DESCRIPTION OF THE DRAWINGS

FIG. 17A to FIG. 17E are views showing display examples in the image pickup device according to the fifth embodiment of the present invention.

DETAILED DESCRIPTION OF THE PREFERRED EMBODIMENTS

The present invention will now be described with reference to FIG. 1 to FIG. 21 showing preferred embodiments thereof.

First of all, a first embodiment of the present invention will be described with reference to FIG. 1 to FIG. 5.

Figure 1:
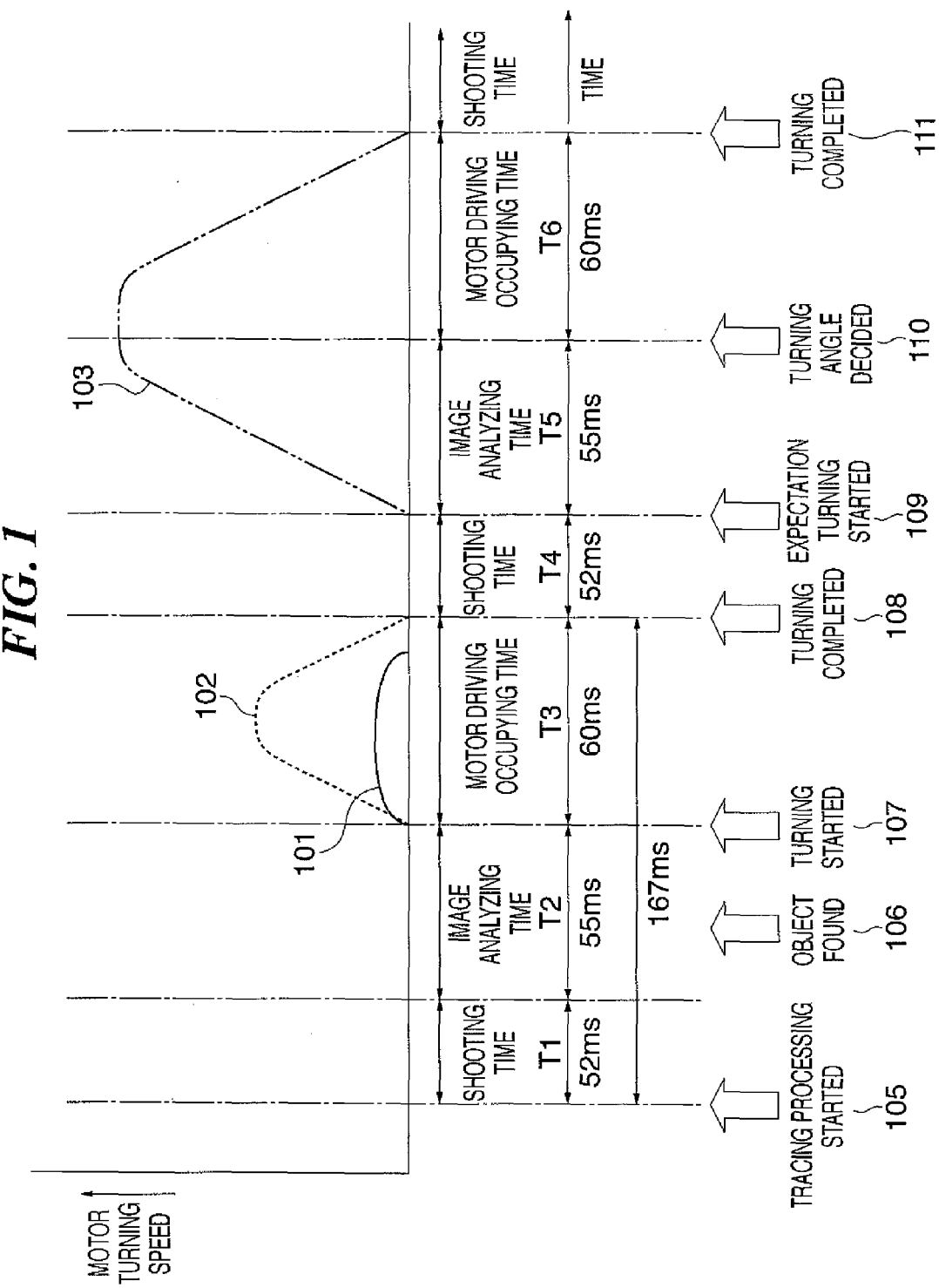
FIG. 1 is a graph showing a concept of controlling a motor in an image pickup device according to a first embodiment of the present invention.

FIG. 1 is a graph showing a concept of controlling a motor during object tracing processing with a monitoring camera as an image pickup device according to the first embodiment of the present invention, in which the ordinate axis and the abscissa axis show the turning speed of a motor and time, respectively.

Also, in FIG. 1, the abscissa axis direction is assigned to a shooting time T1, an image analyzing time T2, and a motor driving occupying time T3, which are in the present embodiment 52 ms, 55 ms, and 60 ms, respectively. The total time of T1, T2 and T3 is 167 ms, which is matched with a frame frequency of an NTSC signal used as a video signal, thereby allowing output of an image shot during the shooting time T1 by a video signal.

With T1, T2, and T3 as one cycle, while shooting by repeating this cycle, tracing processing of an object, and so forth are performed during the image analyzing times T2 and T5.

In FIG. 1, when the tracing processing is started at 105, shooting processing is firstly performed during the time T1, and image analysis is performed during the time T2. An object is found at 106 during this image analyzing processing, and what position on the image the object exists is analyzed to obtain a turning angle. For example, if an object that is different from a normal one is found at a position that is 6° rightward from the monitoring camera, this object is determined to be a target object of tracing, and the motor turns by 6° rightward.

Then, when the turning angle of the motor is decided at 107 and the motor starts turning, the motor is controlled to turn during the motor driving occupying time T3 and thereafter complete turning at 108.

In FIG. 1, a waveform 101 shows an example of a motor turning speed, and specifically, it shows an example that a target object of tracing turns at a low speed, and that the motor operates at a low turning speed of 1° or lower. Further, a waveform 102 shows an example of a motor turning speed, and specifically, it shows a motor turning speed exhibited in a case where a target object of tracing is moving fast, and so as to follow this movement, the motor turns by 6° for example using the entire motor driving occupying time T3. Moreover, a waveform 103 shows an example of a motor turning speed, and specifically, it shows a motor turning speed in a case where a target object of tracing is moving fast, and an expectation turning is performed.

Processing from T1 to T3 comprises one cycle of processing.

In a case where the maximum motor turning angle is 6° in the motor driving occupying time T3, and as image analysis in the image analyzing time T2 shows the object being moved by 10° for example, the motor cannot complete turning even during the entire motor driving occupying time T3.

Then in the next cycle, after shooting is performed during the shooting time T4, the motor starts expectation turning at 109 in parallel to the image analyzing time T5. The motor is controlled to turn by 14°, which is the sum of an incomplete turning angle of the motor (10°−6°=4°) and the moving angle 10° of the object.

When the turning angle of the motor is decided at 110 by the image analysis during the image analyzing time T5 to provide an analyzing result to turn the motor by 16° for example, an instruction is given to change the turning angle of the motor from 14° to 16°, and the motor is controlled to continue turning during the motor driving occupying time T6 and thereafter complete turning at 111.

In the foregoing, summary of controlling the turning of the motor according to a target object of tracing in the image pickup device according to the present embodiment has been described.

As a matter of course, the turning speed of the motor is adjusted not only by the angle described in the aforementioned embodiment but also by a result of image analysis as necessary, and according to the result thereof, the motor is controlled to turn by a specified angle.

Figure 2:
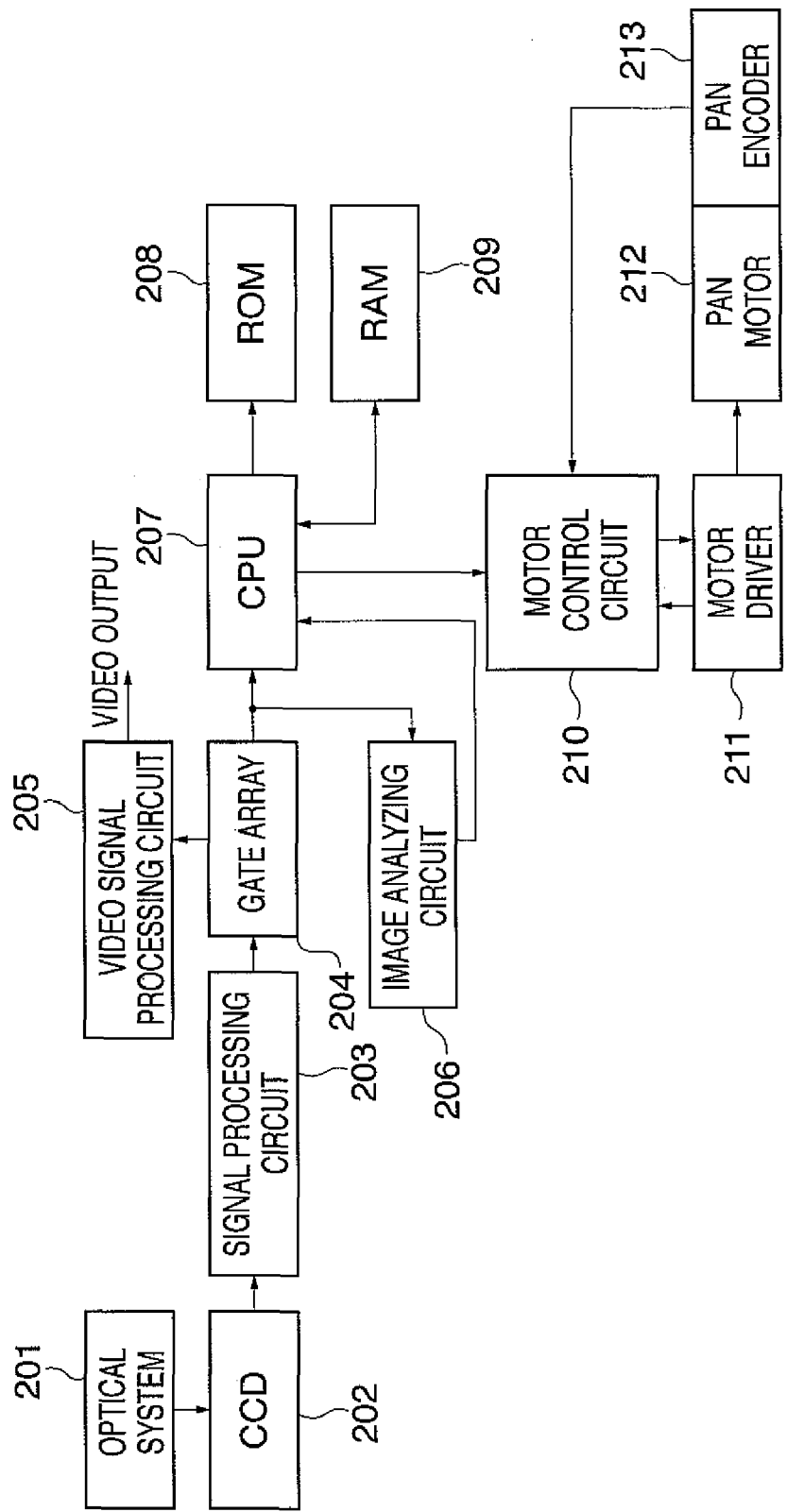
FIG. 2 is a block diagram showing the structure of a monitoring camera as the image pickup device according to the first embodiment of the present invention.

FIG. 2 is a block diagram showing the structure of a monitoring camera having the tracing function as the image pickup device according to the present embodiment.

In FIG. 2, reference numeral 201 denotes an optical system which has a lens, an automatic exposure adjusting (AE) mechanism, a zoom mechanism, an automatic focusing (AFC) mechanism, and so forth. Reference numeral 202 denotes a photoelectric conversion device (CCD), where light passing through the optical system 201 focuses on the CCD 202. The CCD 202 is for obtaining an image by accumulating charges in every cell based on the focused light. Reference numeral 203 denotes a signal processing circuit, which performs signal processing based on an analog signal of an image obtained from the CCD 202 and thereafter A/D converts the signal. Reference numeral 204 denotes a gate array including an image processing circuit for color processing, edge enhancement processing, and the like. Reference numeral 205 denotes a video signal processing circuit which converts a signal after being image-processed into a video signal such as of NTSC, PAL, or the like and performs video-output so that the image can be observed via a monitor TV.

Reference numeral 206 denotes an image analyzing circuit which, as the tracing processing, extracts an object based on the image that is image-processed in the gate array 204, and transmits whether the object is extracted or not to a CPU 207, described later. Further, the image analyzing circuit 206 calculates, when the object exists, at what position with an angle from the center of the image the object exists, and transmits the calculation results thereof to the CPU 207, described later.

Reference numeral 207 denotes a CPU (central processing unit) which executes processing according to an instruction of a program stored in a ROM (read only memory) 208, and stores data and/or a flag in a RAM (random access memory) 209. Further, the CPU 207 gives instructions of shooting processing, image analyzing processing, motor control, and so forth shown in FIG. 1 to the respective blocks, manages time using an internal timer, and also executes various processing based on a received signal. Also, the CPU 207 gives an instruction to a motor control circuit 210, described later, to drive a pan (turning) motor 212, described later, based on the existence of an object and the moving angle of the object by a signal from the image analyzing circuit 206.

Reference numeral 210 denotes a motor control circuit which calculates acceleration/deceleration parameters for the motor, a target angle, a target 5 speed, and so forth based on an instruction from the CPU 207 and outputs a motor pulse signal based on a position signal from a pan encoder 213, described later.

Reference numeral 211 denotes a motor driver which amplifies a current based on the motor pulse signal, and outputs a motor drive signal to the pan motor 212. Reference numeral 212 denotes a pan motor, which is an ultrasonic motor capable of accelerating/decelerating at a high speed and turns by the drive signal from the motor driver 211. Reference numeral 213 denotes a pan encoder which detects turning of the pan motor 212 and outputs a turning position signal thereof. With small slits being provided on a disc attached to a motor axis of the pan motor 212, this pan encoder 213 detects transmission of light projected from a light-emitting element through the slits or detects blocking of light projected from a light-emitting element by a wall between the slits, and based on the detection results thereof, outputs a turning position signal of the motor.

Next, a processing operation of a tracing function in the image pickup device according to the present embodiment will be described with reference to FIG. 3 to FIG. 5.

Figure 3:
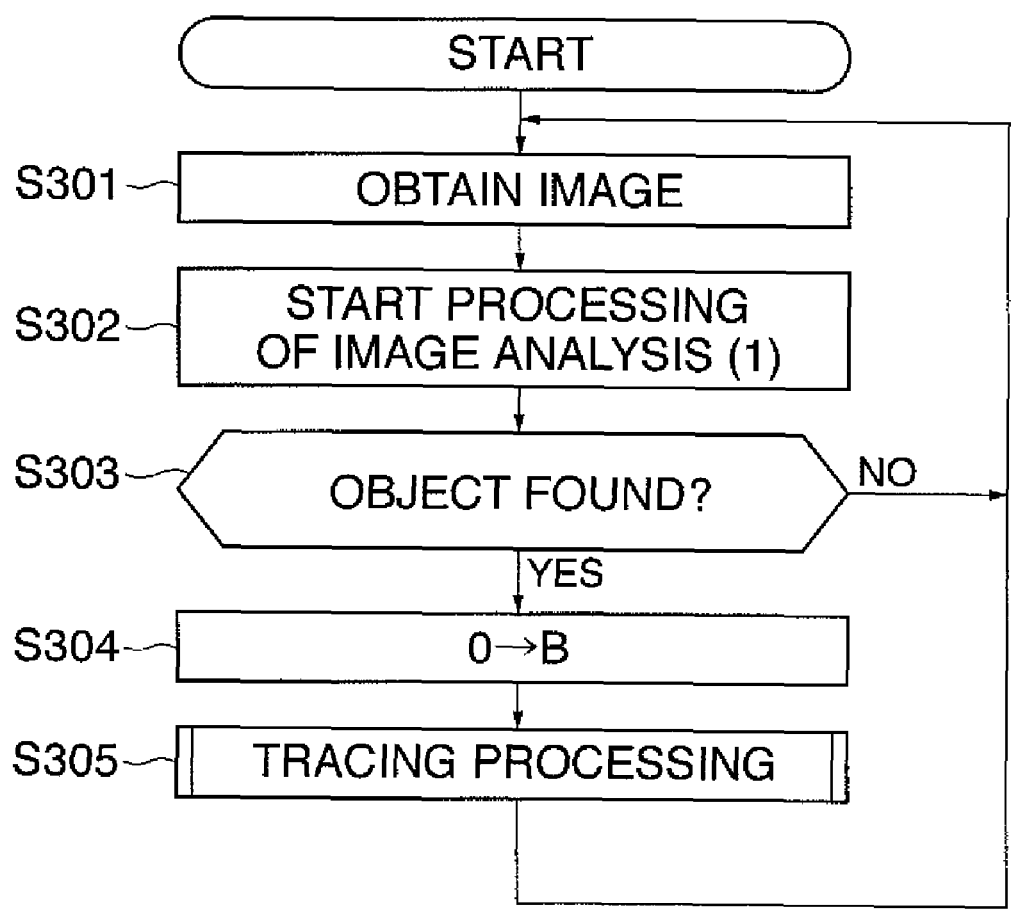
FIG. 3 is a flowchart showing the procedure of a basic processing operation in the image pickup device according to the first embodiment of the present invention.
Figure 4:
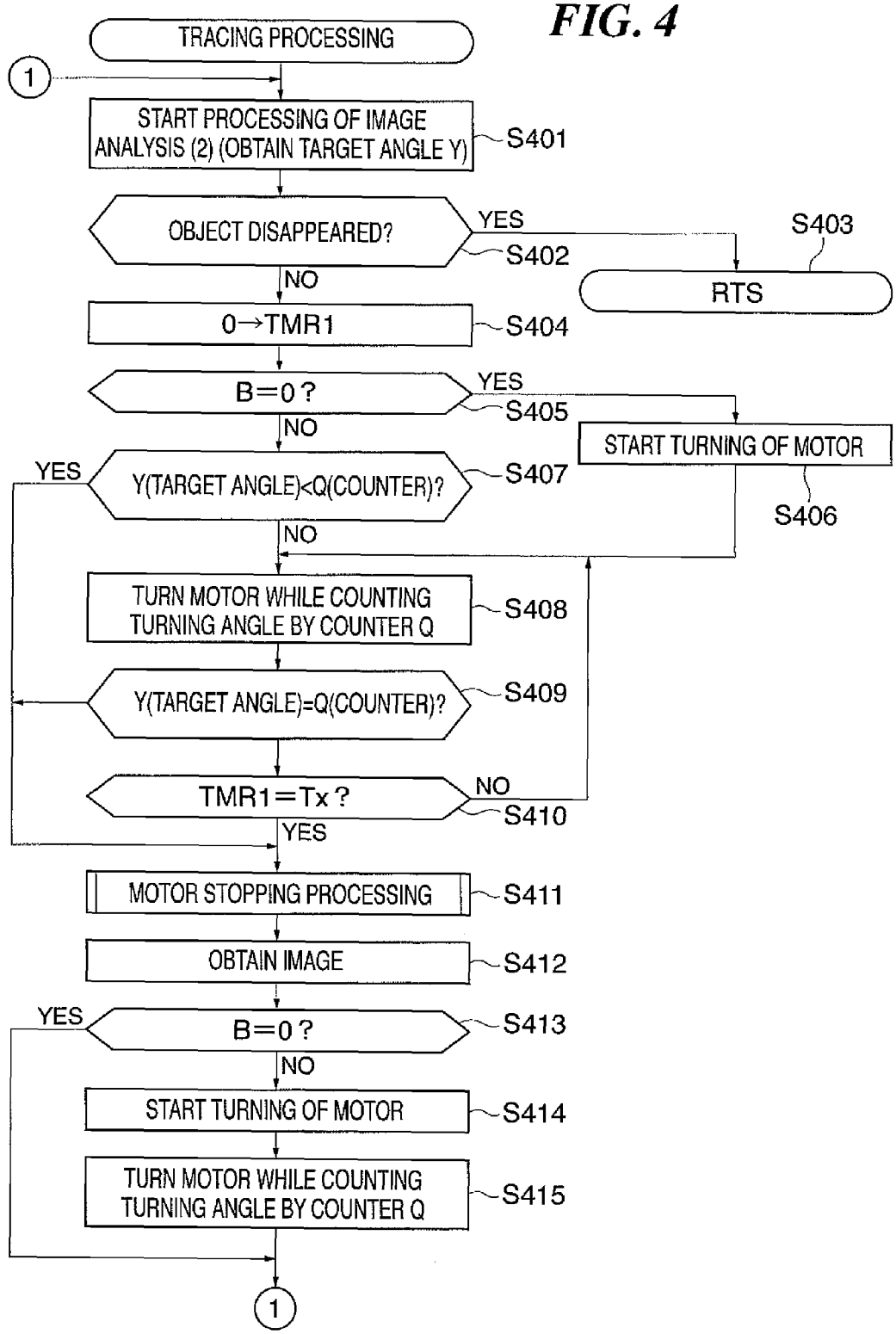
FIG. 4 is a flowchart showing the procedure of a tracing processing operation in the image pickup device according to the first embodiment of the present invention.
Figure 5:
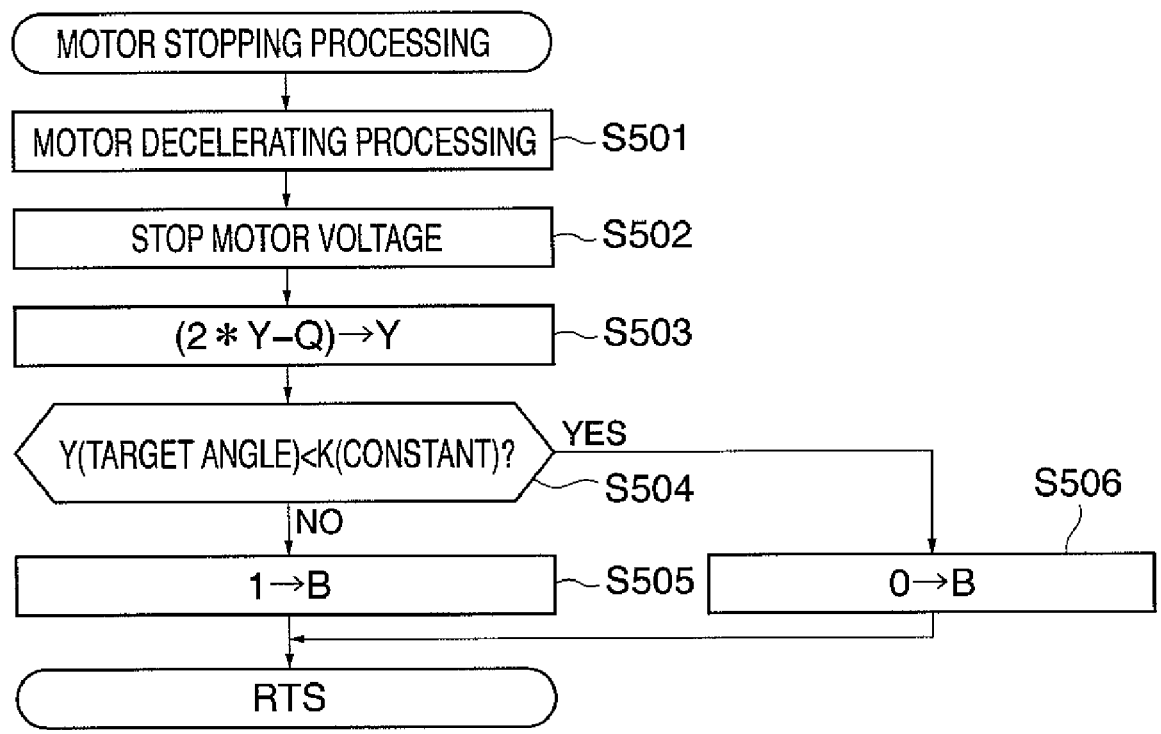
FIG. 5 is a flowchart showing the procedure of a motor stopping processing operation in the image pickup device according to the first embodiment of the present invention.

FIG. 3 to FIG. 5 are flowcharts showing the procedures of a tracing processing operation in the image pickup device according to the present embodiment.

In FIG. 3, first, an image is obtained in a step S301. Specifically, as described with FIG. 2, after light incident via the optical system 201 is received by the CCD 202, signal processing is performed in the signal processing circuit 203, image processing is performed in the gate array 204, and a signal showing the results thereof is transmitted to the image analyzing circuit 206.

Next, processing of image analysis (1) is performed in a step S302, and in the following step S303, it is determined whether or not an object is found is judged.

The image analyzing circuit 206 detects and stores an image that does not change for a certain time period, and thereafter performs processing to analyze that "an object is found" when a newly obtained image is changed by a predetermined amount.

If it is determined in the step S303 that an object is found, the program proceeds to a step S304, whereas if it is determined that no object is found, the processing from the step S301 to the step S303 is executed repeatedly.

In the step S304, a variable B used for the tracing processing is set to "0". Next, in a step S305, the program proceeds to a subroutine for tracing processing shown in FIG. 4, where the tracing processing of the object is performed while driving the motor 212.

Next, the tracing processing will be described with reference to FIG. 4.

In FIG. 4, first, processing of image analysis (2) is performed using an image analyzing circuit 206 of FIG. 2 in a step S401, and processing of identifying the location of the object is performed (a target angle Y is obtained). Next, in a step S402, it is determined whether or not the object has disappeared. Then, as a result of the image analyzing processing in the step S401, if it is determined that the object has disappeared in the step S402, the program proceeds to a step S403 to terminate this subroutine for tracing processing (RTS) and returns to the object finding judging processing in the step S303 in FIG. 3.

On the other hand, if it is determined in the step S402 that an object exists in the judging processing, the program proceeds to a step S404 to clear (change to 0) a count value TMR1 of a timer 1. This timer 1 is for measuring the motor driving occupying time.

Next, it is determined in a step S405 whether or not the variable B is "0" (B=0).

This variable B is a variable for determining whether the motor 212 is to be driven in a low speed mode, in other words only during the motor driving occupying time T3 shown in FIG. 1, or the motor 212 is to be driven in a high speed mode, in other words as the waveform 103 shown in FIG. 1, also during the image analyzing time T2 in parallel to the image analyzing processing. During the low speed mode, the variable B is set to "0", and during the high speed mode, the variable B is set to "1".

If it is determined in the step S405 that B=0 holds, in other words it is in the low speed mode, the program proceeds to a step S406 to cause the motor 212 to start turning, followed by the program proceeding to a step S408.

It should be noted that the low speed mode in which the variable B=0 holds corresponds to a first mode recited in claim 1, the high speed mode in which the variable B=1 holds corresponds to a second mode recited similarly in claim 1.

On the other hand, if it is determined in the step S405 that B=0 does not hold, in other words it is in the high speed mode, turning of the motor 212 is already started in a step S414, described later, and thus the program proceeds to a step S407.

In the step S407, it is determined whether or not a variable Q is larger than a variable Y.

Here, the variable Y is a target angle obtained in the step S401, and the variable Q is an actual turning angle, which is a variable such that a position pulse from the pan encoder 213 shown in FIG. 2 is counted as a turning angle.

In the step S407, the target angle stored in the variable Y is compared with the angle counted by the variable Q, and if it is determined that the variable Q is larger than the variable Y, in other words, the motor 212 turns exceeding the target angle, the program proceeds to a step S411 to stop the motor 212, followed by the program proceeding the next step S412.

On the other hand, in the step S407, if it is determined that the variable Q is smaller than the variable Y, in other words, the turning angle shown by the variable Q does not reach the target angle, the program proceeds to a step S408 to turn the motor 212 while counting the turning angle thereof by the counter Q, followed by the program proceeding to the next step S409.

As shown by the waveform 103 shown in FIG. 1, while the motor 212 is turned also during the image analyzing time, if the object suddenly stops and the target angle Y becomes significantly smaller than a previously obtained target angle, the target angle Y may possibly become smaller than the turning angle counted by the variable Q due to the fact that the motor 212 is already turning. Such a situation is determined by the determination processing in the step S407.

In the step S409, the target angle stored in the variable Y is compared with the angle counted by the variable Q, and it is determined whether or not the both match each other. Then, if it is determined that the target angle stored in the variable Y matches the angle counted by the variable Q, in other words, the actual turning angle Q reaches the target angle Y, the program proceeds to the step S411 to stop the motor 212, followed by the program proceeding to the next step S412.

On the other hand, if it is determined in the step S409 that the target angle stored in the variable Y does not match the angle counted by the variable Q, in other words, the actual turning angle Q does not reach the target angle Y, the program proceeds to a step S410 to determine whether or not the count value TMR1 of the timer 1 matches a variable Tx.

Here, the variable Tx is a variable which stores a value with which the motor 212 can be stopped until the completion of turning 108 shown in FIG. 1 taking a deceleration time into consideration.

In the step S410, if it is determined that the count value TMR1 of the timer 1 matches the variable Tx, the program proceeds to a step S411 to stop the motor 212, followed by proceeding to the next step S412.

On the other hand, if it is determined in the step S410 that the count value TMR1 of the timer 1 does not match the variable Tx, the step S408, the step S409 and the step S410 are executed again.

Here, the step S411 is a subroutine for motor stopping processing.

Before describing processing of and after the step S412, the subroutine for motor stopping processing shown in FIG. 5 will be described.

In FIG. 5, first, the motor 212 is decelerated in a step S501, and power supply to the motor 212 is stopped in the next step S502.

Thus, before the shooting time T1 shown in FIG. 1, the motor 212 is in a stopped state, which enables shooting without flowing of an image.

Next, in a step S503, the value of the variable Y is updated. As this updating processing of the value in the variable Y, there are following three cases.

(1) A case where the variable Y is the same as the counter value Q: when the target angle is the same as the actual turning angle of the motor 212, calculation of (2*Y−Q) results in, since Y and Q are the same value, the variable Y as it is.

(2) A case where the variable Y is larger than the counter value Q: the target angle is larger than the actual turning angle of the motor 212, in other words, a moving amount of the object is faster.

For example, if Y is 0° and Q is 6°, calculation of (2*Y−Q) results in 14°.

(3) A case where the variable Y is smaller than the counter value Q: the target angle is smaller than the actual turning angle of the motor 212.

Specifically, it is a case where the object suddenly stops and the motor 212 overruns.

For example, when Y is 4° and Q is 6°, calculation of (2*Y−Q) results in 2°.

Next, in a step S504, it is determined whether or not the target angle of the variable Y is larger than a constant K.

For example, if the value in constant K is 4° and the target angle of the variable Y calculated in the step S503 is 5°, a judgment result in the step S504 becomes negative (NO), and the program proceeds to a step S505 to set the variable B to "1".

On the other hand, if the value in constant K is 4° and the target angle of the variable Y is 3°, the determination result in the step S504 is affirmative (YES), and hence the program proceeds to a step S506 to set the variable B to "0".

Then, when the variable B is "1", the motor 212 is turned also during the time T2 in FIG. 1 by the processing of a step S414 in FIG. 4 in parallel to the image analyzing processing.

Further, when the variable B is "0", the motor 212 is turned only during the motor driving occupying time T3 by the processing of the step S406 in FIG. 4.

After performing the above processing and completing the processing of the subroutine in FIG. 5, the program returns to the processing in FIG. 4 to execute processing of and after the step S412, during which the image obtaining processing is performed in the step S412, followed by the program proceeding to the next step S413.

The above-mentioned processing corresponds to the time T10 in FIG. 1.

While executing this image obtaining processing, supply of voltage to the motor 212 is stopped by the above-mentioned step S502 in FIG. 5, and turning of the motor 212 is stopped. Therefore, it is possible to obtain an image in a still state, which prevents deterioration of image quality due to flowing on an image or the like.

The description based on FIG. 4 continues.

In the step S413, it is determined whether or not the variable B is "0". Then, if it is determined that the variable B is "0", the program returns to the step S401 to repeatedly execute the above-mentioned processing.

On the other hand, in the step S413, if it is determined that the variable B is "1", not "0", the program proceeds to a step S414 to execute a motor turning start control processing. Here, in parallel to the image analyzing processing, the motor 212 is turned also during the time T2 of FIG. 1.

Next, the program proceeds to a step S415 to execute processing of updating the variable Q for counting the actual turning angle of the motor 212 while turning the motor 212.

After the processing of this step S415 is completed, the program returns to the step S401 to repeat the above-mentioned processing.

In the foregoing, the first embodiment of the present invention has been described using FIG. 1 to FIG. 5.

In the present embodiment, as a first characteristic, the motor 212 is stopped during the time of obtaining an image so as to prevent deterioration in image quality due to flowing of an image or the like while shooting.

Further, as a second characteristic, it is determined whether or not the motor 212 turns during the image analyzing processing performed in the time T2 in FIG. 1 by a value stored in the variable B; therefore, the tracing processing is capable of performing tracing adequately even if an object moves rapidly.

Further, as a third characteristic, after turning of the motor 212, the turning angle of the motor 212 for the next turning is updated in the step S503 in FIG. 5, and the motor 212 is turned while estimating a moving amount of an object.

It should be noted that, in the present embodiment, the method of detecting the position of an object by the image analyzing circuit 206 is described, but the present invention is not limited thereto. For example, a CPU (central processing unit) or the like may be used to identify an object by means of software processing.

Further, in FIG. 2, a case where the rotation motor includes only the pan motor 212 is described, but the present invention is not limited thereto, and it may similarly include a tilt motor.

Further, in FIG. 3, a case of starting the tracing processing in the step S305 via the step S304 when an object is found in the step S303 is described, but the present invention is not limited thereto. The tracing processing may be started when opening/closing of a door or a sound is detected.

Further, a warning sound such as a buzzer may be produced so as to notify the user of finding of a suspicious object.

Moreover, as a monitoring camera, a shooting function by means of infrared or the like may be added.

Next, a second embodiment of the present invention will be described with reference to FIG. 6 to FIG. 9.

It should be noted that the basic structure of an image pickup device in the present embodiment is the same as that of FIG. 2 in the above-mentioned first embodiment, and hence an explanation for the present embodiment will be made with reference to FIG. 2.

Figure 6:
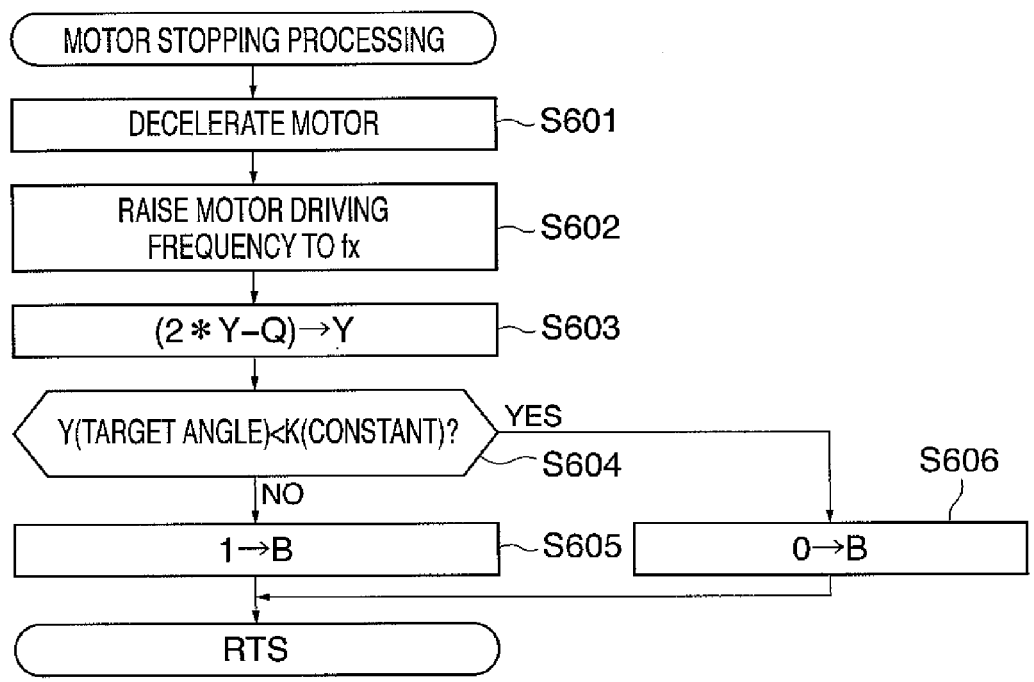
FIG. 6 is a flowchart showing the procedure of a motor stopping processing operation in an image pickup device according to a second embodiment of the present invention.

FIG. 6 is a flowchart showing the procedure of a motor stopping processing operation of the image pickup device according to the present embodiment, in which a step S601 and steps S603 to S606 are the same as the step S501 and the steps S503 to S506 in FIG. 5, therefore descriptions of which are, therefore, omitted.

Figure 7:
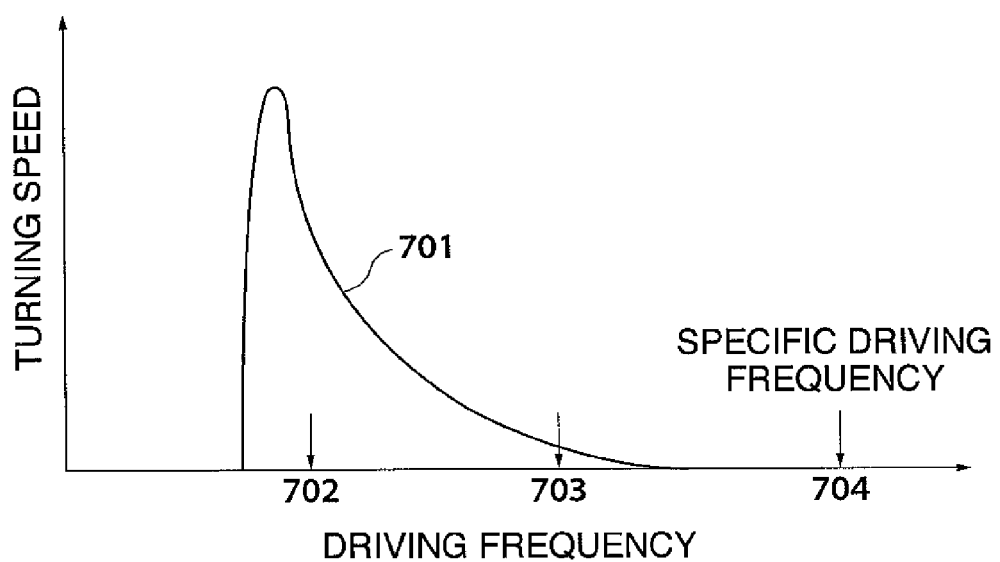
FIG. 7 is a graph showing a relationship between the driving frequency and the turning speed of an ultrasonic motor in the image pickup device according to the second embodiment of the present invention.

FIG. 7 is a diagram showing a relationship between the turning speed and the driving frequency of a motor in the image pickup device according to the present embodiment, in which the ordinate axis and the abscissa axis show the turning speed and the driving frequency, respectively.

Figure 8:
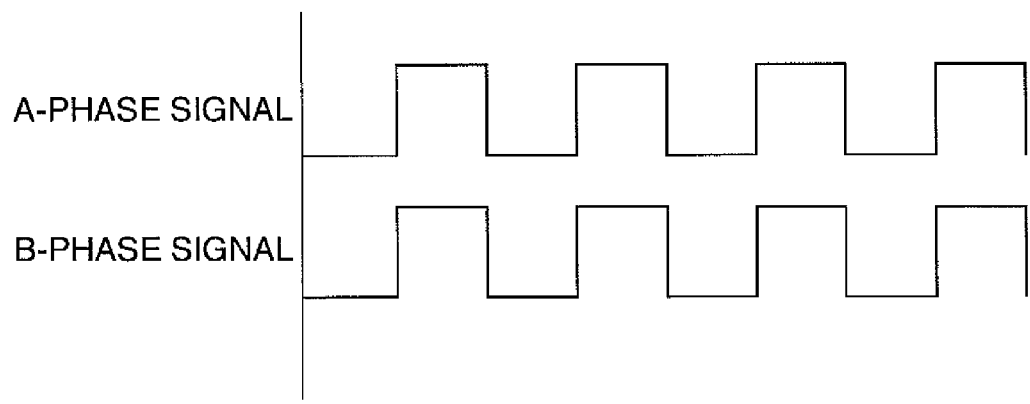
FIG. 8 is a diagram showing waveforms of drive signals for the ultrasonic motor in the image pickup device according to the second embodiment of the present invention, in which the ultrasonic motor is driven in-phase.
Figure 9:
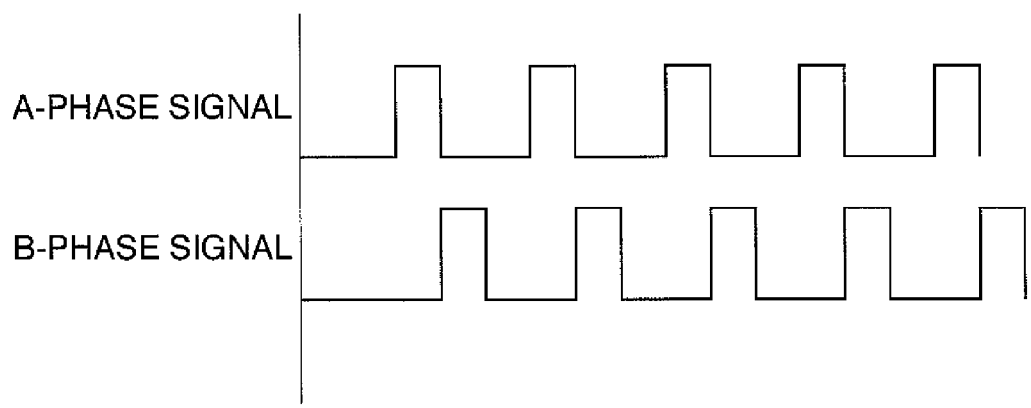
FIG. 9 is a diagram showing waveforms of drive signals for the ultrasonic motor in the image pickup device according to the second embodiment of the present invention, in which respective pulse width of the drive signals are narrowed.

FIG. 8 is a diagram showing waveforms of drive signals for the ultrasonic motor in the image pickup device according to the present embodiment, in which an A-phase signal and a B-phase signal for driving the ultrasonic motor are in-phase, and FIG. 9 is a diagram showing waveforms of drive signals for the ultrasonic motor in the image pickup device according to the present embodiment in which respective pulse width of the drive signals are narrowed.

In the first embodiment, in the step S502 of FIG. 5, the motor 212 is stopped turning by turning off the voltage to the motor is performed, whereas in the present embodiment, the motor 212 is stopped turning by raising the driving frequency of the motor 212 to a frequency with which the motor 212 does not turn.

For example, as shown by a curve 701 in FIG. 7, regarding the ultrasonic motor decreases in turning speed with the gradual increase of the driving frequency as shown by reference numerals 702 and 703, and stops turning at a specific frequency fx shown by reference numeral 704.

Therefore, in order to stop turning of the motor 212 after decelerating turning of the motor 212 in the step S601 of FIG. 6, a driving signal of the raised specific frequency fx is supplied to the ultrasonic motor signal in a step S602.

Further, in the present embodiment, as shown in FIG. 8, an A-phase and a B-phase of the driving signal of the ultrasonic signal may be made in-phase with each other to prevent the motor 212 from turning, or as shown in FIG. 9, the pulse width of the motor signal may be narrowed to decelerate turning of the motor in a considerable manner.

Note that the other structures, operations and effects in the present embodiment are the same as the above-mentioned first embodiment.

Next, a third embodiment of the present invention will be described with reference to FIG. 10 and FIG. 11.

It should be noted that the basic structure of an image pickup device in the present embodiment is the same as that of FIG. 2 in the above-mentioned first embodiment, and hence an explanation for the present embodiment will be made with reference to FIG. 2.

Figures 10, 11:
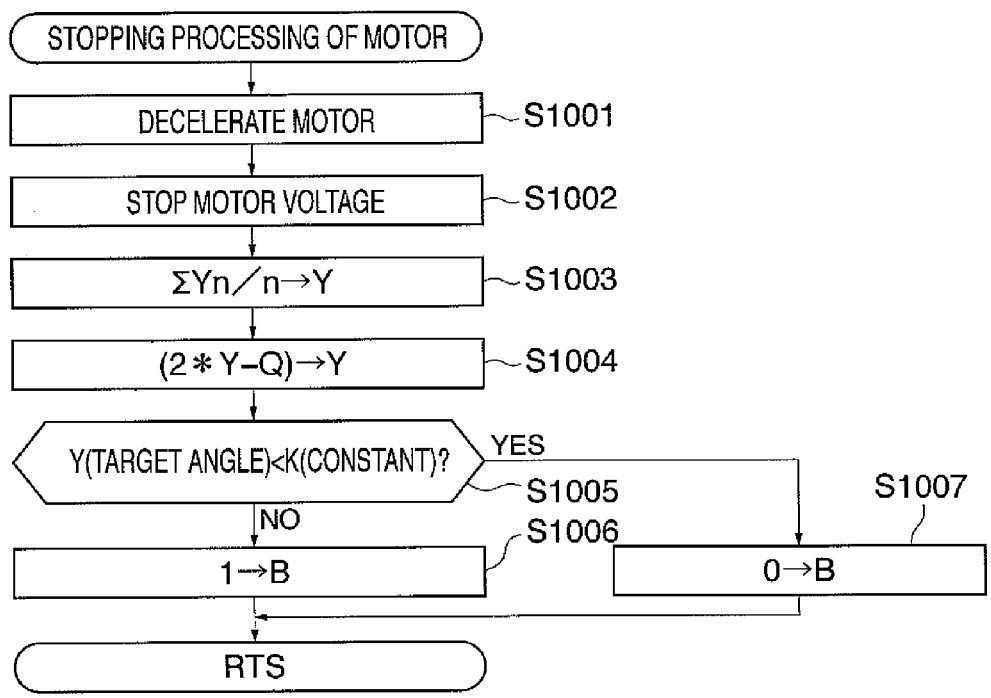
FIG. 10 is a flowchart showing the procedure of a motor stopping processing operation in an image pickup device according to a third embodiment of the present invention.
FIG. 11 is a chart showing an example of a motor driving history in the image pickup device according to the third embodiment of the present invention.

FIG. 10 is a flowchart showing the procedure of a motor stopping processing operation of the image pickup device according to the present embodiment, in which steps S1001, S1002 and S1004 to S1007 are the same as the steps S501 to S507 in FIG. 5 of the above-mentioned first embodiment, descriptions of which are, therefore, omitted.

FIG. 11 is a diagram showing an example of a motor driving history in the image pickup device according to the present embodiment.

In the first embodiment, a temporary target angle for the next motor driving is calculated using the preceding variable Y (target angle) in the step S503 of FIG. 5, whereas in the present embodiment, the temporary target angle for the next motor driving is calculated based on the variable Y obtained by averaging the past motor driving history in a step S1003 of FIG. 10.

For example, FIG. 11 is a chart showing an example of the motor driving history, in which reference symbol n designates the number of the motor being driven, and hence the motor is driven four times in the past.

As shown in FIG. 11, Yn is 3.3°, 3.5°, 3.0°, and 4.0°, when n is 1, 2, 3, and 4, respectively, and averaging them results in Y=3.45°. Instead of the preceding target angle 4.0°, the averaged 3.45° is used to calculate the temporary target angle in the step S1004 of FIG. 10.

Note that the other structures, operations and effects in the present embodiment are the same as the above-mentioned first embodiment.

Next, a fourth embodiment of the present invention will be described with reference to FIG. 12 to FIG. 14.

It should be noted that the basic structure of an image pickup device according to the present embodiment is the same as FIG. 2 in the above-mentioned first embodiment, and hence an explanation for the present embodiment will be made with reference to FIG. 2.

Figure 12:
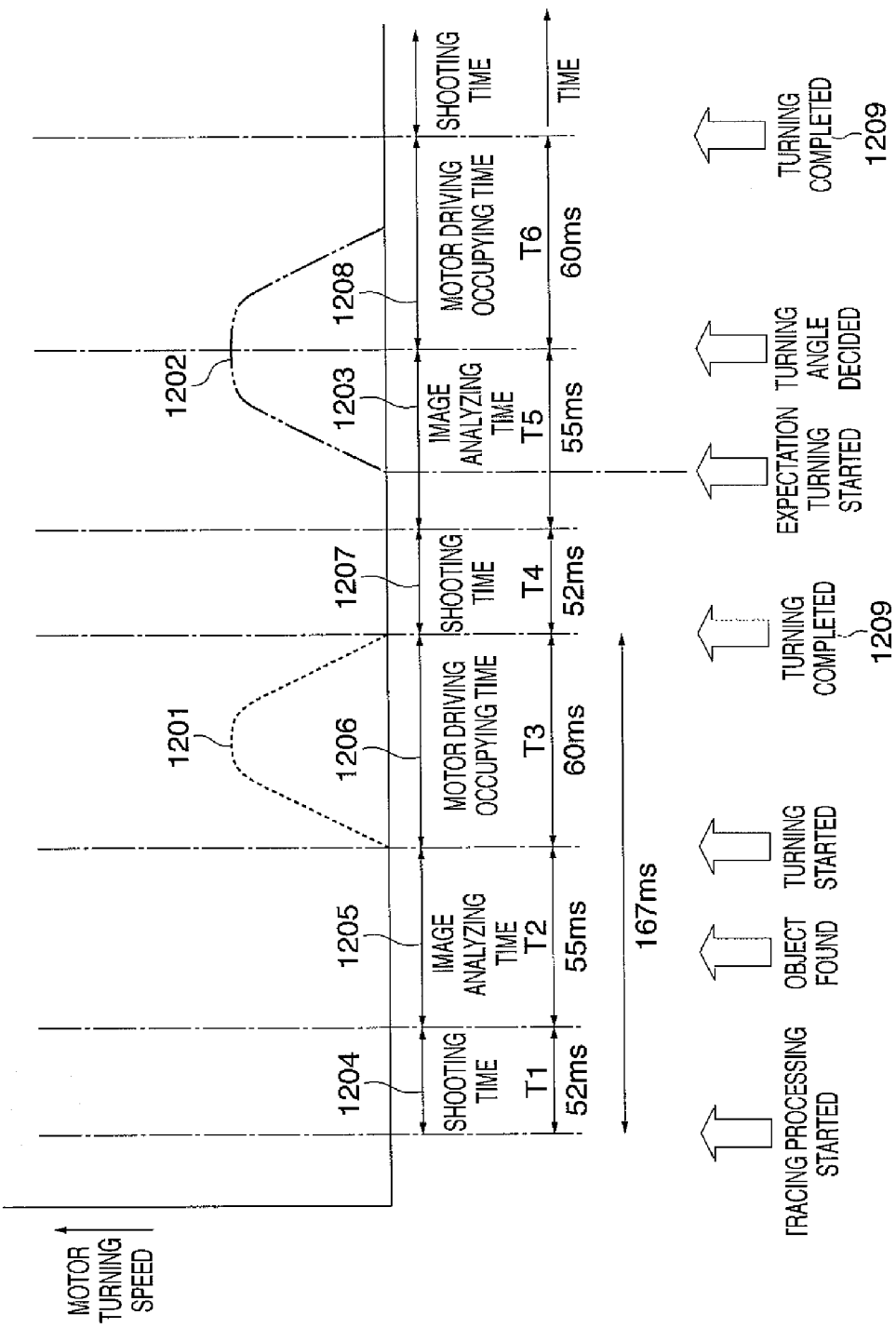
FIG. 12 is a graph showing a concept of controlling a motor in an image pickup device according to a fourth embodiment of the present invention.

FIG. 12 is a diagram showing a concept of controlling a motor during tracing processing with a monitoring camera as an image pickup device according to the present embodiment, in which the ordinate axis and the abscissa axis show the turning speed of a motor and time, respectively.

Further, in FIG. 12, reference numerals 1201 and 1202 denote waveforms of the turning speed of the motor, reference numeral 1203, 1205 denotes an image analyzing time, reference numeral 1204, 1207 denotes a shooting time, and reference numeral 1206, 1208 denotes a motor driving occupying time.

In FIG. 12, the motor is driven as the waveform 1201, and thereafter in the next cycle, referring to the waveform 1201 of the previous motor driving, the motor 212 is driven as the waveform 1202 from in the middle of the image analyzing time 1203.

Driving the motor 212 in this manner provides, when an object such as an intruder moves, a sufficient time from finish of driving the motor 212 to start of shooting, which can prevent deterioration in image quality due to flowing of an image or the like while shooting.

Further, even when the object changes its speed rapidly, the following capability can be improved.

Next, a tracing control processing operation in the image pickup device according to the present embodiment will be described with reference to FIG. 13 and FIG. 14.

Figure 13:
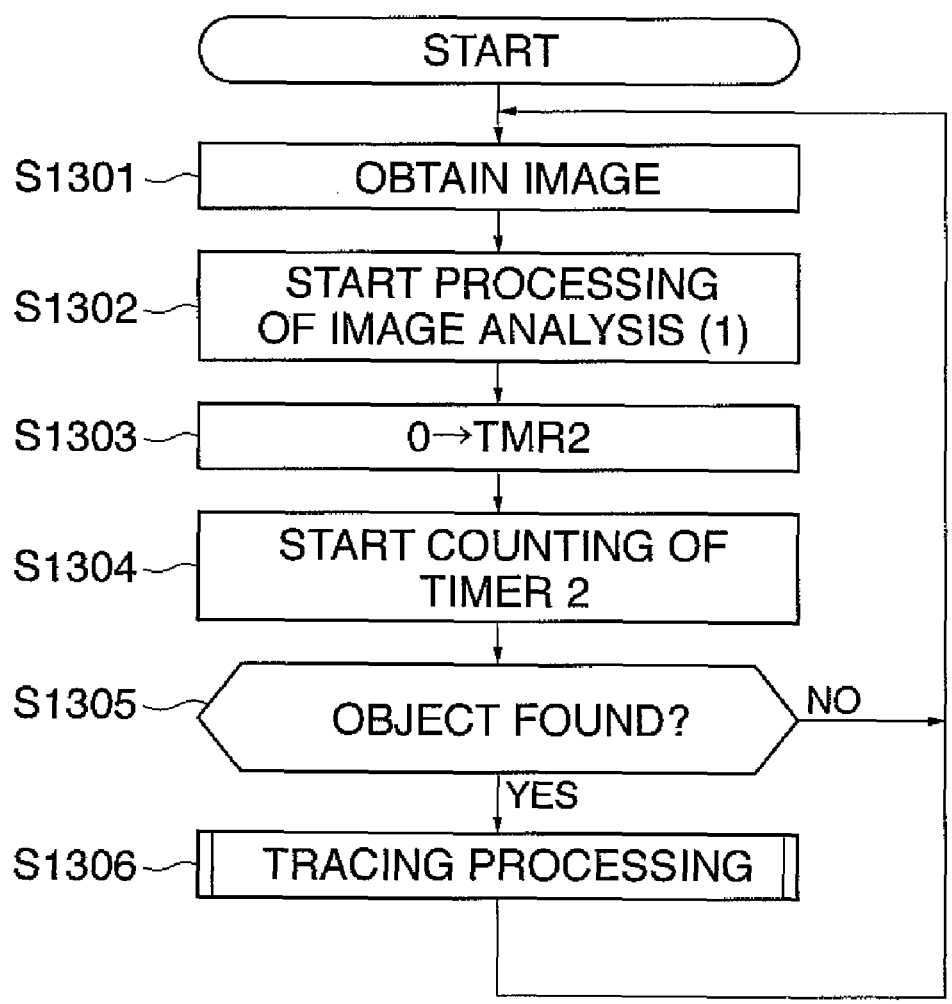
FIG. 13 is a flowchart showing the procedure of a basic processing operation in the image pickup device according to the fourth embodiment of the present invention.
Figure 14:
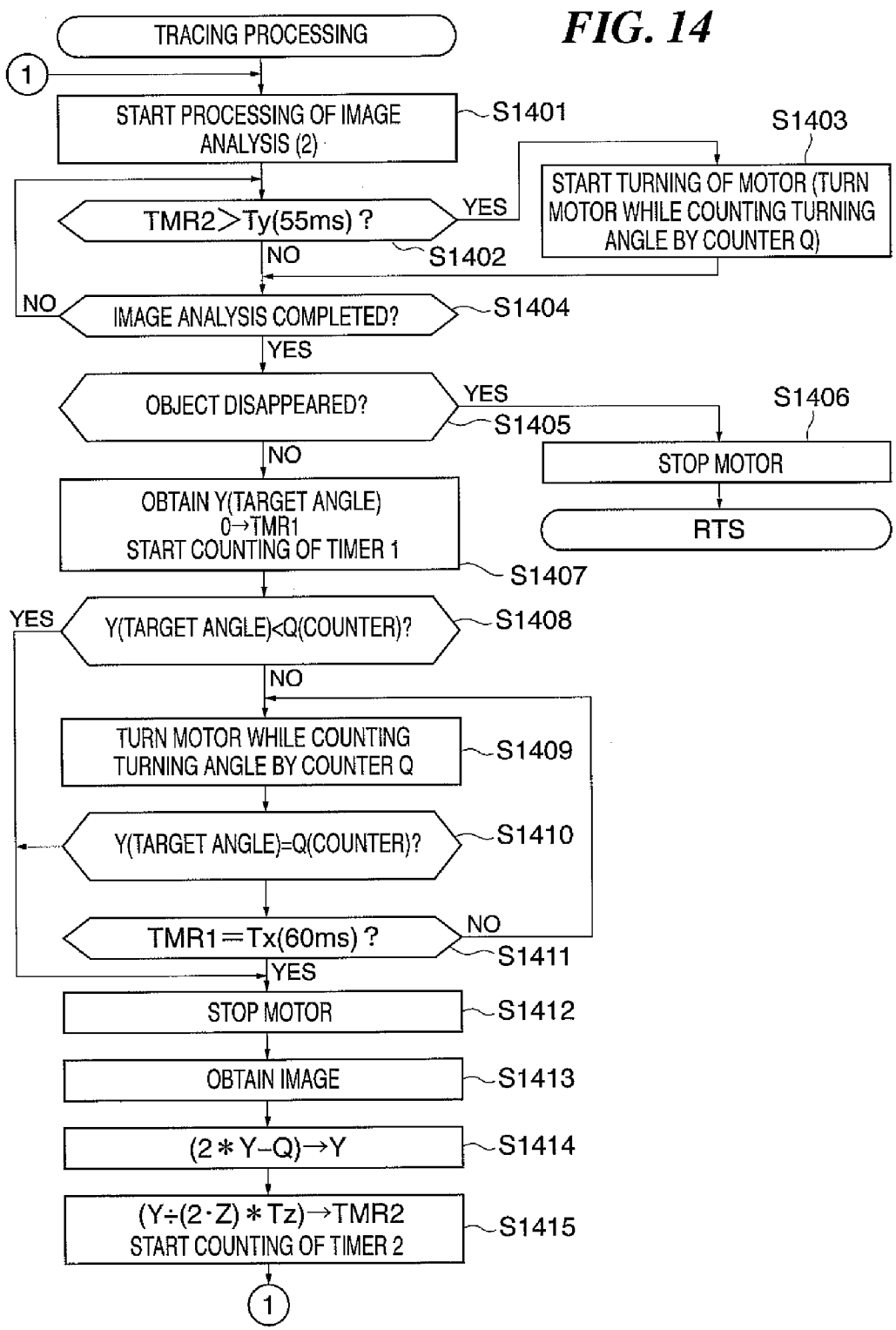
FIG. 14 is a flowchart showing the procedure of a tracing processing operation in the image pickup device according to the fourth embodiment of the present invention.

FIG. 13 and FIG. 14 are flowcharts showing the procedures of a tracing processing operation in the image pickup device according to the present embodiment.

In FIG. 13, first, an image is obtained in a step S1301. This image obtaining processing shows that the image is shot during the shooting time 1204 in FIG. 12, and the image analyzing circuit 206 in FIG. 2 obtains image data thereof.

Next, processing of image analysis (1) is started in a step S1302. This image analysis (1) shows that the shooting in the shooting time 1204 in FIG. 12 is finished, and the image analysis is started.

Next, a count value TMR2 of a timer 2 is set to "0" in a step S1303, and counting of the timer 2 is started in the next step S1304. This timer 2 is used in a tracing processing in the FIG. 14, described later.

Next, it is determined whether an object is found or not in a step S1305. Then, if it is determined that an object is not found, the processing returns to the step S1301, and the processing from the step S1301 to the step S1305 is repeated until an object is found.

Then, if it is determined that an object is found in the step S1305, the program proceeds to a step S1306 to perform tracing processing shown in FIG. 14, followed by returning to the step S1303.

In FIG. 14, first, processing of image analysis (2) is started in a step S1401. In parallel to this processing of image analysis (2), it is determined in a step S1402 whether or not the count value TMR2 of the timer 2 is the same as a fixed value Ty.

Here, the fixed value Ty is a value corresponding to the time of performing the image analyzing processing, which is the image analyzing times 1203 and 1205 in FIG. 12, namely 55 ms in the present embodiment.

If it is determined in the step S1402 that the count value TMR2 of the timer 2 is equal to the fixed value Ty (55 ms), the program proceeds to a step S1403, while if it is determined that the count value TMR2 of the timer 2 is not equal to the fixed value Ty (55 ms), the program proceeds to a step S1404.

Since the count value TMR2 of the timer 2 is set to "0" in the step S1303 of FIG. 13 at the time of starting the tracing processing, the timer 2 counts the time for the image analyzing processing to complete. Therefore, the motor 212 starts turning in the step S1403 after the image analyzing processing has been completed, as shown by the waveform 1201 in FIG. 12.

Further, when a value calculated in a step S1415, described later, is set as the count value TMR2 of the timer 2, the count value TMR2 of the timer 2 becomes equal to the Ty value in the middle of the image analyzing processing. Accordingly, the motor 212 starts turning in the step S1403 after the image analyzing processing has been completed, as shown by the waveform 1202 in FIG. 12.

In the step S1403, the motor 212 starts turning. If the motor 212 is turning, the turning angle (turning position) of the motor 212 is simultaneously counted by a counter Q.

After the processing in the step S1403 is completed, the program proceeds to the step S1404. In the step S1404, it is determined whether or not the image analyzing processing is completed. Then, if it is determined that the image analyzing processing is not completed, the program returns to the step S1402, whereas if it is determined that the image analyzing processing is completed, the program proceeds to a step S1405.

In the step S1405, it is determined whether or not the object has disappeared from the image by the image analyzing processing. Then, if it is determined that the object has disappeared, the program proceeds to a step S1406 to stop the motor 212, followed by returning from the subroutine for tracing processing shown in FIG. 14 to the processing shown in FIG. 13.

On the other hand, if it is determined in the step S1405 that the object exists, the program proceeds to a step S1407 to obtain the position of the object obtained by the image analyzing processing as the variable (target angle) Y, set the count value TMR1 of the timer 1 to "0", and start counting of the timer 1.

Next, the program proceeds to a step S1408 to determine whether or not the variable Y is smaller than the variable Q.

Here, the variable Y is the target angle obtained in the step S1403, and the variable Q is a variable for counting the turning angle of the motor 212 while the motor 212 turning in the step S1403.

In the step S1408, the target angle stored in the variable Y is compared with the angle counted by the variable Q, and then if the variable Q is larger than the variable Y, in other words, the motor 212 has turned exceeding the target angle, the program proceeds to a step S1412 to stop the motor 212.

On the other hand, if the variable Q is not larger than the variable Y in the step S1408, in other words, the turning angle shown by the variable Q has not reached the target angle, the program proceeds to a step S1409 to allow the motor 212 to turn while counting the turning angle of the motor 212 by the counter Q, followed by the program proceeds to a step S1410.

As the waveform 1202 in FIG. 12, while the motor 212 is turned also during the image analyzing time, if the object suddenly stops and thus the target angle Y becomes significantly smaller than a previously obtained target angle, the target angle Y possibly becomes smaller than the turning angle counted by the variable Q due to the fact that the motor 212 is already turning. Such a situation is determined by the determination processing in the step S1408 of FIG. 14.

In the step S1410, the target angle stored in the variable Y is compared with the turning angle counted by the variable Q, and it is determined whether or not the both match each other. Then, if it is determined that the variable Y matches the variable Q, in other words, the turning angle has reached the target angle, the program proceeds to the step S1412 to stop the motor 212.

On the other hand, if it is determined in the step S1410 that the variable Y does not match the variable Q, the program proceeds to a step S1411 to determine whether or not the count value TMR1 of the timer 1 matches a variable Tx.

Here, the variable Tx is a variable which stores a value with which the motor 212 can be stopped until the completion of turning 1209 shown in FIG. 12 taking a deceleration time into consideration, and if it is determined that the count value TMR1 of the timer 1 matches the variable Tx, the program proceeds to the step S1412 to stop the motor 212.

On the other hand, if it is determined in the step S1411 that the count value TMR1 of the timer 1 does not match the variable Tx, the steps S1409, S1410, and S1411 are repeatedly executed to turn the motor 212.

After stopping the motor 212 in the step S1412, the program proceeds to a step S1413 to obtain an image. This image obtaining processing is for obtaining an image shot during the shooting time 1204, 1207 in FIG. 12.

After the image obtaining processing is completed in the step S1412, in other words, after the shooting time, the target angle Y is updated in a step S1414.

The target angle Y is updated using the calculation formula used in the step S503 of FIG. 5 in the above-mentioned first embodiment. This updating processing of the target angle Y in the step S1414 is for temporarily setting the target angle Y for the next turning after turning of the motor 212 is completed according to the target angle Y and an actual turning angle Q.

Next, the count value TMR2 of the timer 2 is set in the step S1415.

The calculation formula $(Y/(2Z)*Tz)$ is for setting the count value TMR2 of the timer 2 so as to turn the motor 212 by a ½ angle of the target angle Y during the image analyzing time (55 ms) 1203, 1205 in FIG. 12, details of which will be described later.

The contents of the calculation formula is to divide the target angle Y set in the step S1414 by 2 and a fixed value Z, and multiply the result by a fixed value Tz.

Here, the fixed value Z is a possible turning angle during the image analyzing time (55 ms), and the fixed value Tz is the image analyzing time (55 ms).

For example, when the target angle Y is 10° and Tz is 8°, the result is $(10/2/8 \times 55) = 34.5$ ms.

The timer 2 counts up from 34.4 ms, and after 15.6 ms to reach 55 ms, the motor 212 starts turning by the processing in the step S1403.

This means that operating the motor 212 during 34.4 ms out of the image analyzing time 55 ms causes the motor 212 to turn by (10/2)=5°.

As another example, when the target angle Y is 16° and Tz is 8°, the result is (16/2/8×55)=55 ms.

This means that immediately after the image analyzing processing, the count value TMR2 of the timer 2 is determined to be 55 ms or larger in the determination processing in the step S1402, and hence the motor 212 starts turning in the step S1403.

After the count value TMR2 of the timer 2 is set to the calculation result in the step S1415, the program returns to the step S1401 to repeatedly execute the above-mentioned processing.

In the foregoing, the fourth embodiment of the present invention has bee described with reference to FIG. 12 to FIG. 14.

In the present embodiment, a first characteristic is that a turning start position of the motor 212 is decided by a value set as the count value TMR2 of the timer 2, which allows operation of the motor 212 from an arbitrary position calculated in the image analyzing time 1203 as shown by the waveform 1202 in FIG. 12.

Processing in this manner provides more turning of the motor 212 during the image analyzing time. In a case where an object such as an intruder into the image moves at a constant speed, a sufficient time from finish of driving the motor 212 to start of shooting can be ensured, which can further prevent deterioration in image quality due to flowing of an image or the like while shooting.

Also, even when the object changes its speed rapidly, the motor 212 is turning in advance during the image analyzing time, which allows more turning of the motor 212 including the turning occupying time, thereby improving the following capability.

Moreover, in this embodiment, the target angle is, in the step S1415 of FIG. 14, divided by 2 to operate the motor 212 with a ½ angle of the target angle Y in the image analyzing processing time (55 ms), but the target angle Y may be divided by another value, or it may be a variable.

Next, a fifth embodiment of the present invention will be described with reference to FIG. 15 to FIG. 21.

In the present embodiment, an ultrasonic motor as a drive source for a tracing processing function, an automatic zooming function and a panning operation in a video camera.

Figure 15:
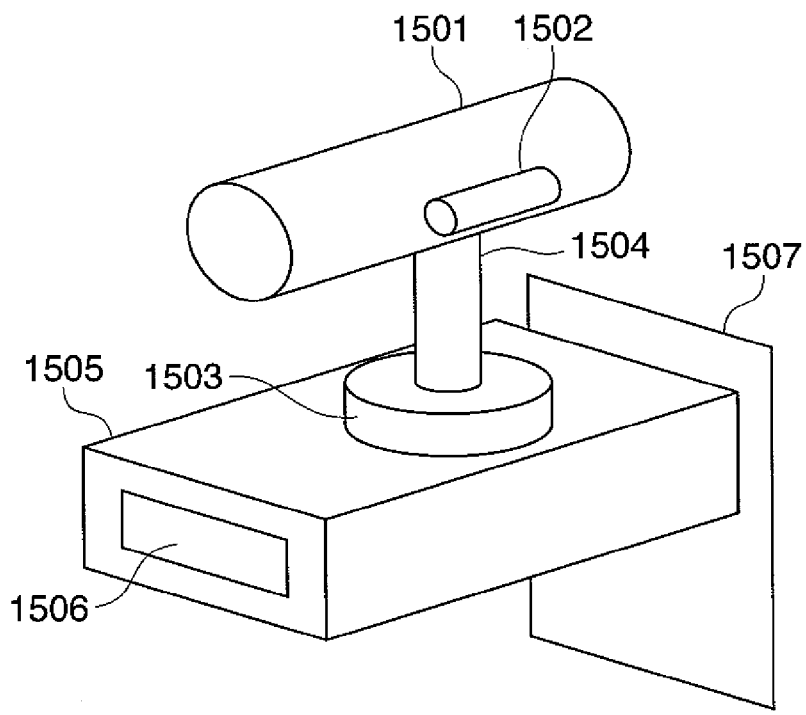
FIG. 15 is an image view showing the structure of a video camera as an image pickup device according to a fifth embodiment of the present invention.

FIG. 15 is an image view of a video camera as an image pickup device according to the present F embodiment.

In FIG. 15, reference numeral 1501 denotes a camera head which includes an optical system such as a lens, an AE mechanism, an automatic focusing mechanism, and so forth. Reference numeral 1502 denotes a zooming ultrasonic motor which drives a zoom mechanism and enables automatic zooming. Reference numeral 1503 denotes a pan ultrasonic motor which turns its shaft 1504 to change an optical axis direction of the camera head 1501. Reference numeral 1505 denotes a case accommodating circuit components shown in FIG. 18, described later. The case 1505 has a keyboard 1506 as an operating part arranged thereon. Also, the case 1505 has a display device 1507 is turnably attached thereto. This display device 1507 displays an image obtained from the camera head 1501.

Figure 16:
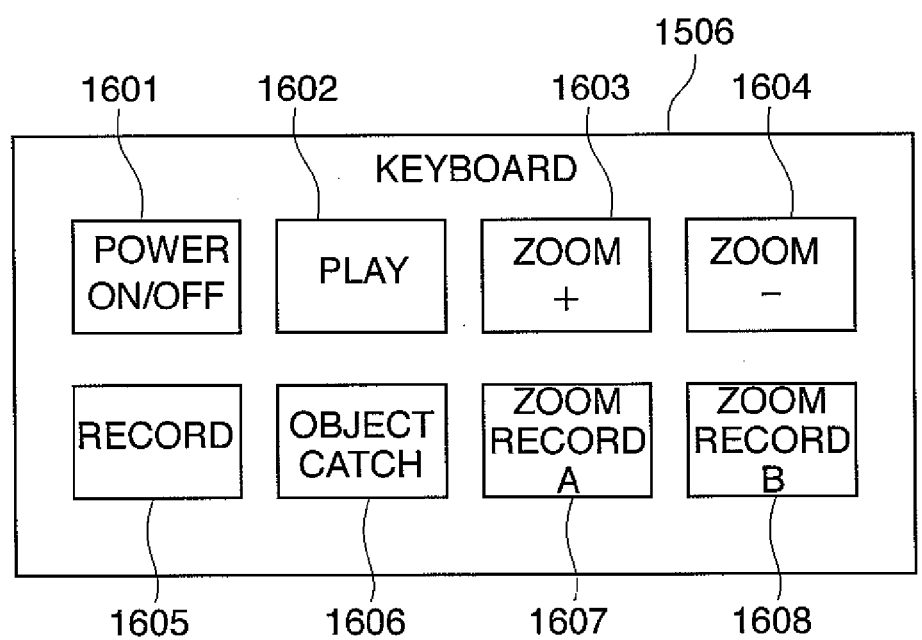
FIG. 16 is a plan view showing the arrangement of a keyboard in the image pickup device according to the fifth embodiment of the present invention.

FIG. 16 is a view showing keys arranged on the keyboard 1506, in which reference numeral 1601 denotes a power switch key, which is operated when turning on/off the power of the video camera. Reference numeral 1602 denotes a play key, which is operated when reproducing a recorded image. Reference numerals 1603 and 1604 denote zoom operating keys, which are operated when using the zoom function. Reference numeral 1605 denotes a record key, which is operated when recording an image. Reference numeral 1606 denotes an object catch key, which is operated for catching an object and is operated when finding a target object of automatic tracing. Reference numerals 1607 and 1608 denote second and third record keys, which are operated when recording while performing tracing processing and automatic zooming.

Moreover, the operation and processing procedure of the video camera as the image pickup device according to the present embodiment will be described with reference to flowcharts of FIG. 19 to FIG. 21.

FIG. 17A to FIG. 17E are views showing how the automatic zooming and the automatic tracing are performed with the video camera as the image pickup device according to the present embodiment, and showing an example in which an operator of the video camera is shooting a relay race in an athletic festival or the like.

First, the operator operates the object catch key 1606 shown in FIG. 16. If an object is very small as shown in FIG. 17C, the image is enlarged with an object of shooting 1701 or 1702, which is considered to be an object target, as a center as shown in FIG. 17B and FIG. 17E.

If the found object of shooting 1701 or 1702 is an object which is wanted by the operator, the zoom record A key 1607 is operated to start recording as it is.

Further, when the object wanted by the operation is the object of shooting 1701 rather than 1702, operating the object catch key 1606 again changes the target object from as shown in FIG. 17E to as shown in FIG. 17B.

After the recording is started in this manner, when the size of the object becomes large as shown in FIG. 17D, the zoom magnification is changed to the size of the object as shown in FIG. 17B.

Further, when the operator desires to perform recording with the size of the object large, the zoom record B key 1608 is operated to perform recording with an enlarged screen shown in FIG. 17A.

Figure 18:
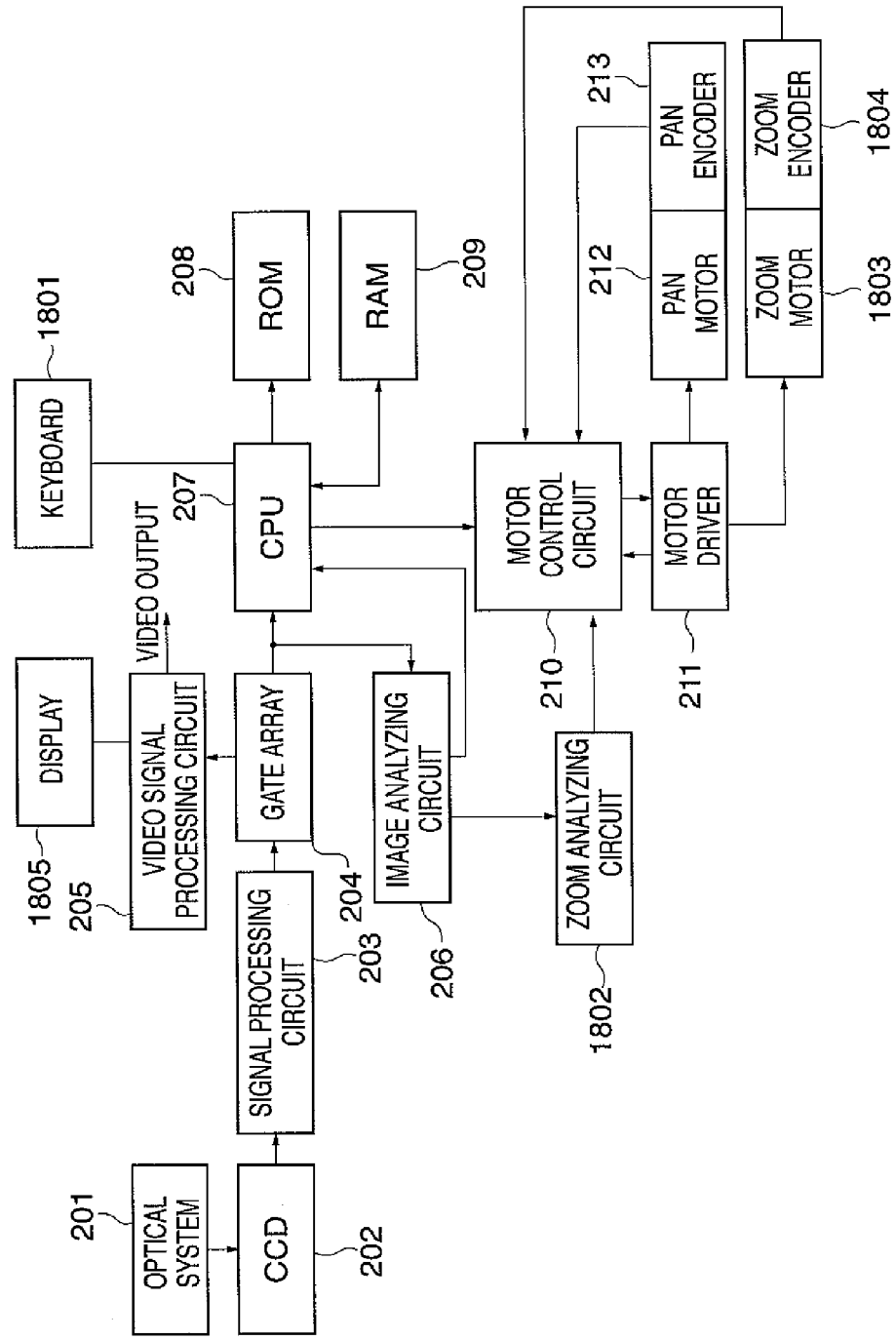
FIG. 18 is a block diagram showing the structure of a video camera as the image pickup device according to the fifth embodiment of the present invention.

FIG. 18 is a block diagram showing the structure of a video camera as the image pickup device according to the present embodiment.

In FIG. 18, the same functional components as those in FIG. 2 of the above-mentioned first embodiment are designated by the same reference numerals.

FIG. 18 is different from FIG. 2 in that addition of a keyboard 1801, a zoom analyzing circuit 1802, a zoom motor 1803, a zoom encoder 1804 and a display 1805 are added to the structure in FIG. 2.

The keyboard 1801 has the same keys arranged as those of the keyboard 1506 shown in FIG. 16. When the position of an object is decided by the image analyzing circuit 206, the zoom analyzing circuit 1802 obtains the size of the object and executes zoom analyzing processing. When changing the zoom magnification as a result of the zoom analyzing processing in the zoom analyzing circuit 1802, a signal indicating a turning angle corresponding to the changed zoom magnification is outputted to the motor control circuit 210.

The motor control circuit 210 performs control of turning the pan motor 212, which is instructed from the CPU 207, and performs control of turning the zoom motor 1803, which is instructed from the zoom analyzing circuit 1802. The zoom motor 1803 updates the zoom magnification by turning. The zoom encoder 1804 detects the turning angle of the zoom motor 1803. The display 1805 displays an image, necessary information and so forth.

Next, the procedures of performing automatic tracing and automatic zooming with the video camera as the image pickup device according to the present embodiment will be described with reference to FIG. 19 to FIG. 21.

Figure 19:
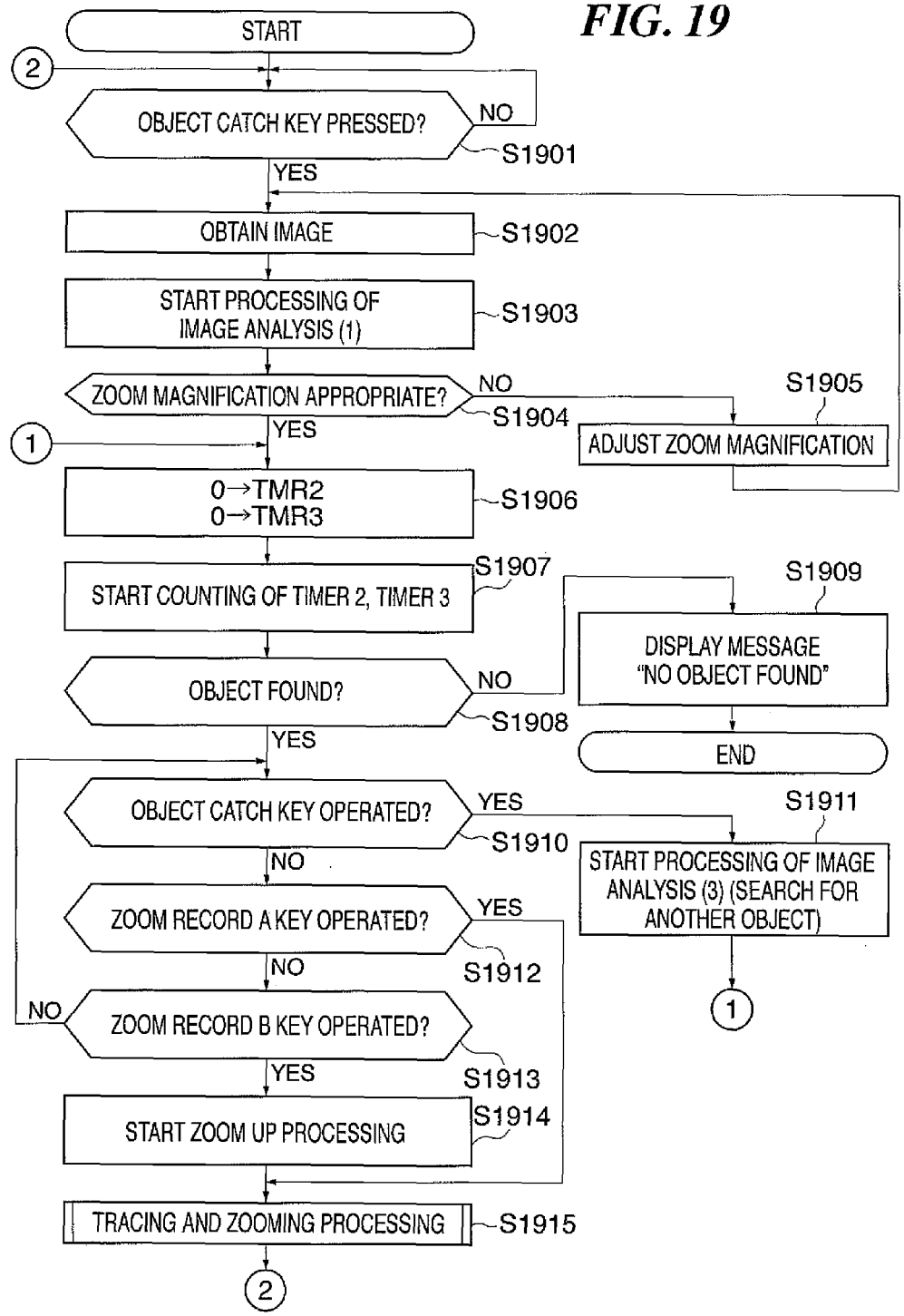
FIG. 19 is a flowchart showing the procedure of a processing operation in the image pickup device according to the fifth embodiment of the present invention.
Figure 20:
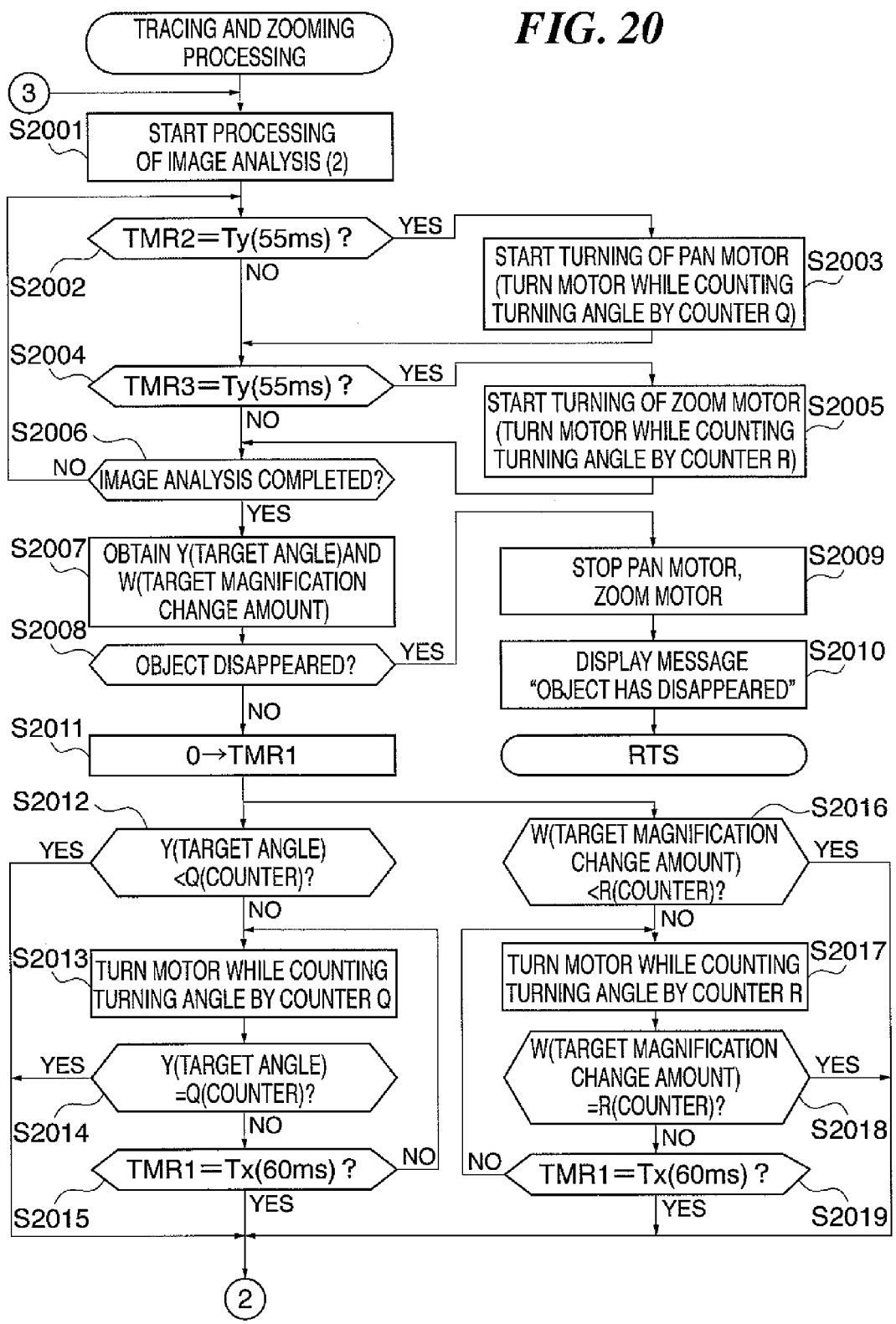
FIG. 20 is a flowchart showing the procedure of a tracing and zooming processing operation in the image pickup device according to the fifth embodiment of the present invention.
Figure 21:
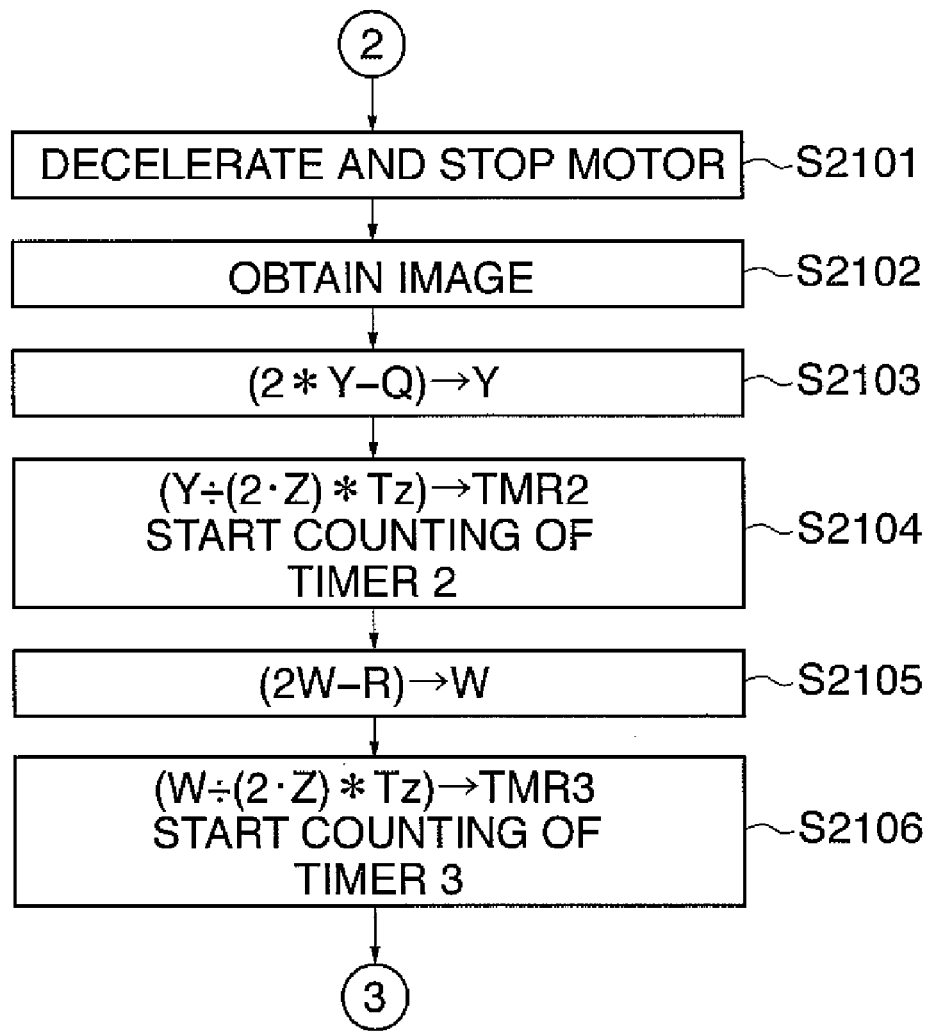
FIG. 21 is a flowchart showing the procedure of the tracing and zooming processing operation in the image pickup device according to the fifth embodiment of the present invention.
Figure 22:
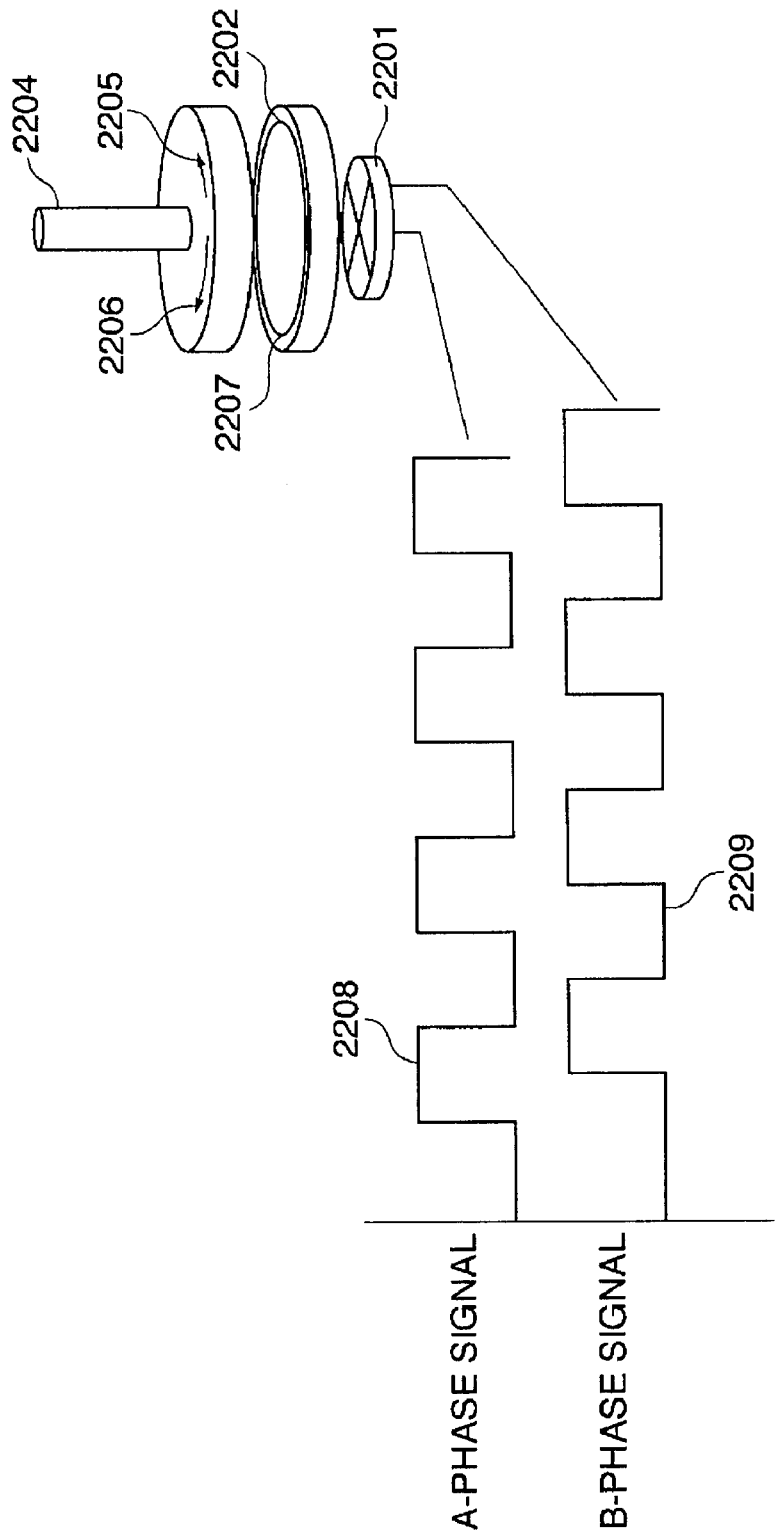
FIG. 22 is a schematic view showing an overall structure of a typical ultrasonic motor.
Figure 23:
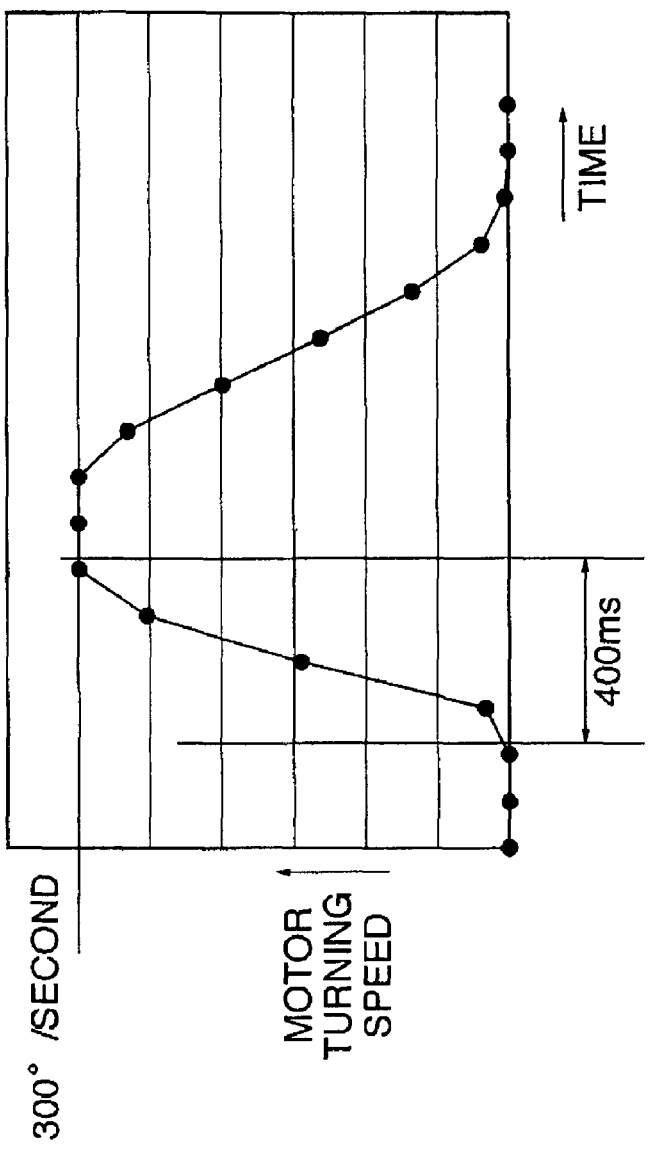
FIG. 23 is a graph showing a speed of a typical brushless motor.
Figure 24:
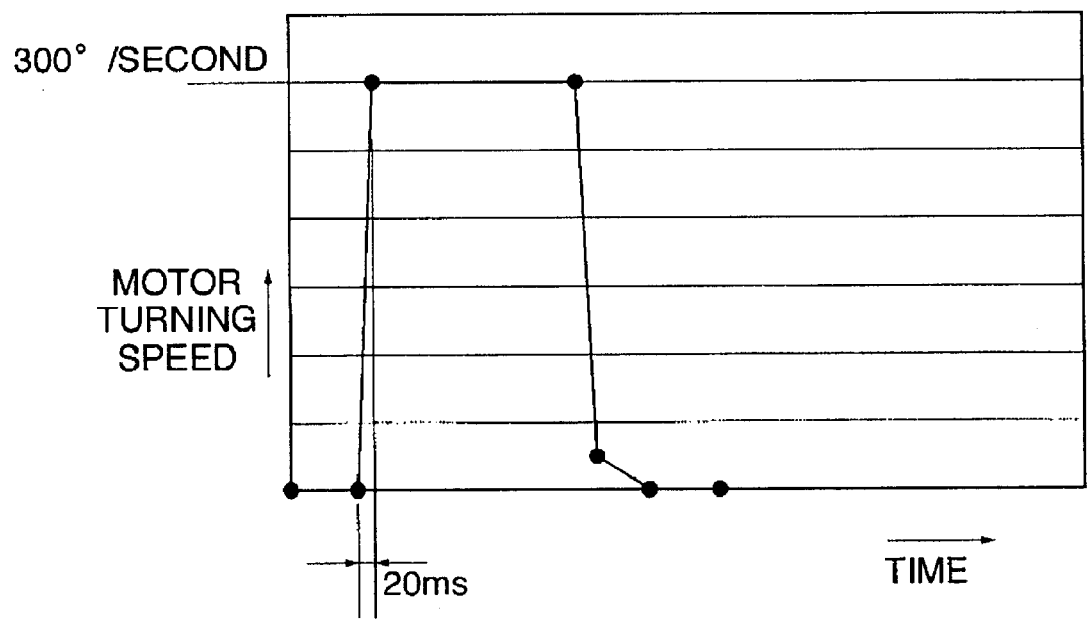
FIG. 24 is a graph showing a speed of a typical ultrasonic motor.

FIG. 19 to FIG. 21 are flowcharts showing the procedure of processing of performing automatic tracing and automatic zooming with the video camera as the image pickup device according to the present embodiment.

In FIG. 19, it is determined whether or not the object catch key 1606 is operated in a step S1901 until the object catch key 1606 is operated. Then, if it is determined that the object catch key 1606 is operated, the program proceeds to a step S1902. In the step S1902, an image is obtained, and in the next step S1903, the image analyzing circuit 206 in FIG. 18 is used to perform image analysis (1) as to whether or not an object exists in the image obtained in the step S1902. At this time, it is determined whether or not the zoom magnification is appropriate in the next step S1904.

In order to find an object, if the zoom magnification is not appropriate as shown in FIG. 17A and FIG. 17C, the program proceeds to a step S1905 to adjust the zoom magnification to provide an image as shown in FIG. 17B.

After the zoom magnification is adjusted in the step S1904, the program returns to the step S1902 to obtain an image again.

On the other hand, if it is determined in the step S1904 that the zoom magnification is appropriate, the program proceeds to the step S1905 to set the count value TMR2 of the timer 2 and the count value TMR3 of the timer 3 to "0", respectively, and thereafter proceeds to a step S1907 to cause the timer 2 and the timer 3 start counting. These timer 2 and timer 3 are used for tracing and zooming processing, which will be described later using FIG. 14.

Next, the program proceeds to a step S1908 to judge whether or not an object is found. Then, if it is determined that no object is found, the program proceeds to a step S1909 to display a message indicating this, for example "no object is found" on the display 1805, followed by terminating the program.

On the other hand, if it is determined that an object is found in the step S1908, the program proceeds to a step S1910 to determine again whether or not the object catch key 1606 is operated. Then, if it is determined that the object catch key 1606 is operated again, the object found in the step S1908 is considered to be different from an object which is desired by the operator as the object 1702 shown in FIG. 17E; therefore, another object is searched as image analysis (3) in a step S1911 using the image analyzing circuit 206 in FIG. 18.

After the another object is searched in the step S1911, the program returns to a step S1906 to repeatedly execute the above-mentioned processing. On the other hand, if it is determined that the object catch key 1606 is not operated in the step S1910, the object found in the step S1908 is considered to be the object desired by the operator; therefore, the program proceeds to a step S1912.

In the step S1912, it is determined whether or not the zoom record A key 1607 is operated. Then, if it is determined that the zoom record A key is operated, the program proceeds to a step S1915 to execute a subroutine for tracing and zooming processing shown in FIG. 20.

On the other hand, if it is determined in the step S1912 that the zoom record A key 1607 is not operated, the program proceeds to a step S1913 to determine whether or not the zoom record B key 1608 is operated. Then, if it is determined that the zoom record B key 1608 is not operated, the program returns to the step S1910, whereas if it is determined that the zoom record B key 1608 is operated, the program proceeds to a step S1914.

In the step S1914, zoom up processing is performed to enlarge the image as shown in FIG. 17B so that an image as shown in FIG. 17A can be captured. After the zoom up processing in the step S1914 is performed, the program proceeds to a step S1915 to execute the subroutine for tracing and zooming processing shown in FIG. 20, followed by returning to the step S1901.

Next, the tracing and zooming processing in the image pickup device according to the present embodiment will be described with reference to FIG. 20.

FIG. 20 is a flowchart showing the procedure of the tracing and zooming processing after preprocessing in FIG. 19 is performed.

The description of FIG. 20 will be given with reference to the conceptual diagram of the above-mentioned FIG. 12.

In FIG. 20, processing of image analysis (2) is started in a step S2001. Here, this processing is for analyzing at which position on the image the object exists and how large the size of the object is.

In parallel to the image analyzing processing started in the step S2001, it is determined whether or not the count value TMR2 of the timer 2 is equal to a fixed value Ty in a step S2002.

Here, the Ty value corresponds to the time of performing the image analyzing processing, which is the time (55 ms) 1203, 1205 in FIG. 12 similarly to the above-mentioned fourth embodiment.

If it is determined in the step S2002 that the count value TMR2 of the timer 2 is equal to the fixed value Ty, the program proceeds to a step S2003, whereas if it is determined that the count value TMR2 of the timer 2 is not equal to the fixed value Ty, the program proceeds to a step S2004.

Since the count value TMR2 of the timer 2 is set to "0" in the step S1906 of FIG. 19 at the time of starting the tracing and zooming processing, the timer 2 counts until the image analyzing processing is completed. Therefore, the pan motor 212 starts turning in the step S2003 after the image analyzing processing is completed as shown by the speed waveform 1201 in FIG. 12, similarly to the above-mentioned fourth embodiment.

When a value calculated in a step S2104 of FIG. 21, described later, is set as the count value TMR2 of the timer 2, a value of the count value TMR2 of the timer 2 becomes equal to the Ty value in the middle of the image analyzing processing. Accordingly, similarly to the above-mentioned fourth embodiment, the motor 212 starts turning in the middle of the image analyzing processing as shown by the speed waveform 1202 in FIG. 12.

In the step S2003, the pan motor 212 starts turning. If the pan motor 212 is turning, the turning position of the pan motor 212 is simultaneously counted by a counter Q.

After the processing in the step S2003 is completed, the program proceeds to the step S2004.

In the step S2004, it is determined whether or not the count value TMR3 of the timer 3 is equal to the fixed value Ty. The timer 3 is for determining a timing of starting the zoom motor 1803.

Since the count value TMR3 of the timer 3 is set to "0" in the step S1906 of FIG. 19 at the time of starting the tracing and zooming processing, the timer 3 counts until the image analysis is completed.

When a value calculated in a step S2106 of FIG. 21, described later, is set as the count value TMR2 of the timer 2, the count value TMR2 of the timer 2 becomes equal to the value of Ty in the middle of the image analyzing processing. Accordingly, similarly to the above-mentioned fourth embodiment, the zoom motor 1803 starts turning in the middle of the image analyzing processing as shown by the waveform 1202 in FIG. 12.

If it is determined in the step S2004 that the count value TMR3 of the timer 3 is equal to the fixed value Ty, the program proceeds to a step S2005, whereas if it is determined that the count value TMR3 of the timer 3 is not equal to the fixed value Ty, the program proceeds to a step S2006.

In the step S2005, the zoom motor 1803 starts turning. If the zoom motor 1803 is turning, the turning position of the zoom motor 1803 is simultaneously counted by a counter R. After the processing in the step S2005 is completed, the program proceeds to the step S2006.

In the step S2006, it is determined whether or not the image analysis is completed. Then, if it is determined that the image analysis is not completed, the program returns to the step S2002 to repeatedly execute the processing of and after the above-mentioned step S2003.

On the other hand, if it is determined in the step S2006 that the image analysis is completed, the program proceeds to a step S2007 to obtain Y (target angle) and W (target magnification change amount) as results of the image analysis.

Next, in a step S2008, it is determined whether or not the object has disappeared. Then, if it is determined that the object has disappeared, the program proceeds to a step S2009 to stop the pan motor 212 and the zoom motor 1803.

Next, the program proceeds to a step S2010 to display a message indicating the disappearance of the object, for example "object has disappeared" on the display 1805, followed by returning from the subroutine for tracing and zooming processing to the main routine shown in FIG. 19.

On the other hand, in the step S2008, if it is determined that the object exists, the program proceeds to a step S2011 to set "0" as the count value TMR1 of the timer 1, and thereafter executes processing of steps S2012 to S2019.

The timer 1 is for counting the motor driving occupying times 1206 and 1208 in FIG. 12, similarly to the above-mentioned fourth embodiment.

The steps S2012 to S2015 show the procedure of control processing of the pan motor 212.

Further, the steps S2016 to S2019 show the procedure of control processing of the zoom motor 1803, and the steps S2012 to S2015 and the steps S2016 to S2019 are processed in parallel by the CPU 207 and the zoom analyzing circuit 1802 in FIG. 18.

First, in the step S2013, it is determined whether or not the variable Y is smaller than the variable Q.

Here, the variable Y is the target angle obtained in the step S2007. Further, the variable Q is a variable for counting the target angle of the pan motor 212 along with turning of the pan motor 212 in the step S2003.

In the step S2013, the target angle stored in the variable Y is compared with the angle counted by the variable Q, and if it is determined that the variable Q is larger than the variable Y, in other words, the pan motor 212 has turned exceeding the target angle, the program proceeds to a step S2101 in FIG. 21 to perform stopping processing the pan motor 212.

On the other hand, if it is determined in the step S2013 that the variable Q is smaller than the variable Y, in other words, the turning angle shown by the variable Q has not reached the target angle, the program proceeds to the step S2013 to perform processing of turning the pan motor 212 while counting the turning angle of the pan motor 212 by the counter Q.

Next, the program proceeds to the step S2014 to compare the target angle stored in the variable Y with the angle counted by the variable Q to determine whether or not the both are equal to each other.

Then, if it is determined that the variable Y is equal to the variable Q, in other words, the turning angle of the pan motor 212 has reached the target angle, the program proceeds to the step S2101 of FIG. 21 to perform stopping processing the pan motor 212.

On the other hand, if it is determined in the step S2014 that the variable Y is not equal to the variable Q, the program proceeds to the step S2015 to determine whether or not the count value TMR1 of the timer 1 is equal to the variable Tx.

Here, the variable Tx is a variable which stores a value with which the pan motor 212 can be stopped until the completion of turning 1209 in FIG. 12 of the above-mentioned fourth embodiment taking a deceleration time into consideration.

In the step S2015, if it is determined that the count value TMR1 of the timer 1 is equal to the variable Tx, the program proceeds to the step S2101 of FIG. 21 to perform stopping processing the pan motor 212.

On the other hand, if it is determined in the step S2015 that the count value TMR1 of the timer 1 is not equal to the variable Tx, the steps S2013, S2014, and S2015 are executed to turn the pan motor 212.

The steps S2016 to S2019 are the procedure of control processing of the zoom motor 1803, in which processing similar to the control processing of the pan motor 212 in the above-mentioned steps S2012 to S2015 is performed.

In the step S2016, it is determined whether a variable W is smaller than a variable R or not.

Here, the variable W is the target magnification change amount obtained in the step S2007. Further, the variable R is a variable for counting the turning angle of the zoom motor 1803 along with the turning of the zoom motor 1803 in the step S2005.

In the step S2016, the target angle stored in the variable W is compared with the zoom magnification counted by the variable R, and if it is determined that the variable R is larger than the variable W, in other words, the zoom motor 1803 has turned exceeding the target magnification change amount and thus zoomed excessively, the program proceeds to the step S2101 in FIG. 21 to perform stopping processing the zoom motor 1803.

On the other hand, in the step S2016, if the variable W is larger than the variable X, in other words, the target angle indicated by the variable R has not reached the target magnification change amount, the program proceeds to the step S2017 to perform processing of turning the zoom motor 1803 while counting the turning angle of the zoom motor 1803 by the counter R.

Next, the program proceeds to the step S2018 to compare the target magnification change amount stored in the variable W with the angle counted by the variable R and determine whether or not the both are equal to each other.

Then, if it is determined that the variable W is equal to the variable R, in other words, the turning angle of the zoom motor 1803 has reached the target zoom magnification, the program proceeds to the step S2101 in FIG. 21 to perform stopping processing the zoom motor 1803.

On the other hand, if it is determined in the step S2018 that the variable W is not equal to the variable R, the program proceeds to the step S2019 to judge whether or not the count value TMR1 of the timer 1 is equal to the variable Tx.

Here, the variable Tx is a variable which stores a value with which the zoom motor 1803 can be stopped until the completion of turning 1209 in FIG. 12 of the above-mentioned fourth embodiment considering a deceleration time.

In the step S2019, if it is determined that the count value TMR1 of the timer 1 is equal to the variable Tx, the program proceeds to the step S2101 of FIG. 21 to perform stopping processing the zoom motor 1803.

On the other hand, if it is determined in the step S2019 that the count value TMR1 of the timer 1 is not equal to the variable Tx, the program returns to the step S2017 to execute the steps S2017, S2018, and S2019 to turn the zoom motor 1803.

Next, processing after stopping the zoom motor 1803 will be described using the flowchart of FIG. 21.

In FIG. 21, first in the step S2101, the zoom motor 1803 is decelerated and stopped, and an image is obtained in the next step S2102.

This image obtaining processing is processing of obtaining an image shot during the shooting times 1204 and 1207 of FIG. 12 in the above-mentioned fourth embodiment.

After the obtaining an image in the step S2102 is completed, in other words, after the shooting time is passed, the target angle Y is updated in a step S2103.

This updating processing the target angle Y is the same as the calculation formula used in the step S503 of FIG. 5 in the above-mentioned first embodiment and the step S1414 of FIG. 14 in the fourth embodiment.

Also, this updating processing of the target angle Y is for temporarily setting the target angle Y for the next turning after turning of the zoom motor 1803 is completed according to the target angle Y and a state of the actual turning angle Q, and details thereof are the same as in the above descriptions of the first and fourth embodiments, descriptions of which are, therefore, omitted.

Next, in the step S2104, processing of setting the count value TMR2 of the timer 2 and starting of counting the timer 2 is performed.

This setting of the count value TMR2 of the timer 2 is the same as the calculation formula used in the step S1415 of the FIG. 14 in the above-mentioned fourth embodiment.

The calculation formula (Y/(2Z)*Tz) is for setting the count value TMR2 of the timer 2 so as to turn by a ½ angle of the target angle Y during the image analyzing time (55 ms) 1203, 1205 in FIG. 12 in the above-mentioned fourth embodiment.

Regarding the contents of the calculation formula, refer to the description of the step S1415 of FIG. 14 in the above-mentioned fourth embodiment.

Next, in a step S2105, the target magnification change amount W of the zoom motor 1803 is updated.

This updating processing of the target magnification change amount W of the zoom motor 1803 is for temporarily setting the target angle W for the next turning after turning of the zoom motor 1803 is completed according to the target magnification change amount W and a state of the actual turning angle R.

Next, in the step S2106, processing of setting the count value TMR3 of the timer 3 is performed and the timer 3 starts counting, followed by the program returning to the step S2001 in FIG. 20.

The calculation formula (W/(2Z)*Tz) for performing the setting process of the count value TMR3 of the timer 3 and causing the timer 3 to start counting in the step S2106 is for setting the count value TMR3 of the timer 3 so as to change a magnification change amount of ½ of the target magnification change amount W during the image analyzing time (55 ms) 1203, 1205 in FIG. 12 in the above-mentioned fourth embodiment.

Specifically, the target magnification change amount W set in the step S2007 in FIG. 20 is divided by 2 and a fixed value Z and multiply the result by a fixed value Tz.

Here the fixed value Z is a magnification that can be changed during the image analyzing time (55 ms), and the fixed value Tz is the image analyzing time (55 ms).

For example, when the target magnification change amount is 1.8×, and the Tz is 1.6×, the result is (1.8/2/1.6× 55)=30.9 ms.

The timer 3 counts up from 30.9 ms, and after 19.1 ms to reach 55 ms, the zoom motor 1803 starts turning by the processing in the step S2005 of FIG. 20.

This means that driving the zoom motor 1803 during 30.9 ms in the image analyzing time 55 ms realizes zooming the magnification (1.4×) that is half of the 1.8× zooming.

In the foregoing, the fifth embodiment has been described with reference to FIG. 15 to FIG. 21.

In the present embodiment, it is shown that the present invention is applicable not only to a monitoring camera but also to a video camera, and also applicable to control of not only a pan motor and a tilt motor, but also a zoom motor.

The above-described embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims the benefit of Japanese Patent Application No. 2005-209956 filed Jul. 20, 2005, which is hereby incorporated by reference herein in its entirety.

What is claimed is:

1. An image pickup device acquiring image data, comprising:
   an acquiring unit configured to acquire the image data from a capturing unit;
   a detecting unit configured to detect an object to be traced from the image data of one frame acquired by the acquiring unit;
   a moving unit configured to move the capturing unit, in a move time set to the one frame, to trace the object detected by the detecting unit from the image data of the one frame; and
   a control unit configured to control the moving unit such that the capturing unit traces the object detected from a first frame during a time period including time before the move time set to a second frame next to the first frame in addition to the move time set to the first frame when a moving angle of the capturing unit, to trace the object detected from the first frame acquired by the acquiring unit, is larger than a predetermined angle.

2. The image pickup device according to claim 1, further comprising a moving angle calculating unit configured to obtain the moving angle of the capturing unit during detection of the object from the second frame based on the moving angle of the capturing unit to trace the object detected from the first frame.

3. The image pickup device according to claim 2, further comprising a moving angle changing unit configured to change the moving angle obtained by the moving angle calculating unit based on the object detected by the detecting unit from the second frame.

4. The image pickup device according to claim 1, further comprising a moving start time calculating unit configured to obtain a moving start time of the moving unit based on the moving angle to trace the object detected from the first frame.

5. The image pickup device according to claim 1, wherein the moving unit is an ultrasonic motor.

6. The image pickup device according to claim 1, wherein said image detecting unit includes a tracing device that traces the object detected.

7. The image pickup device according to claim 1, further comprising an automatic zoom mechanism that controls a lens unit of said image pickup device automatically.

8. The image pickup device according to claim 1, wherein:
the moving unit includes a motor, and
the moving unit sets a driving frequency of the motor higher in a low speed driving processing state than in a high speed driving processing state.

9. The image pickup device according to claim 1, wherein:
the moving unit includes a motor, and
the moving unit sets a pulse width of a drive signal for the motor shorter in a low speed driving processing state than in a high speed driving processing state.

10. The image pickup device according to claim 1, wherein:
the moving unit includes a motor, and
the moving unit sets a phase difference of a plurality of drive signals for the motor smaller in a low speed driving processing state than in a high speed driving processing state.

11. The image pickup device according to claim 1, wherein the detecting unit has a zoom magnification changing unit that changes, when detecting the object of tracing, a zoom magnification of a zoom mechanism that controls a lens unit of said image pickup device as necessary.

12. The image pickup device according to claim 1, wherein the detecting unit changes the object of tracing by an operation.

13. The image pickup device according to claim 1, further comprising a zoom magnification changing unit that changes a zoom magnification of a zoom mechanism of the image pickup device.

14. A method for of controlling an image pickup device acquiring image data, comprising:
an acquiring step of acquiring the image data from a capturing unit;
a detecting step of detecting an object to be traced from the image data of one frame acquired in the acquiring step;
a moving step of moving the capturing unit, in a move time set to the one frame, to trace the object detected in the detecting step from the image data of the one frame; and
a control step of controlling the moving step such that the capturing unit traces the object detected from a first data frame during a time period including time before the move time set to a second frame next to the first frame in addition to the move time set to the first frame when a moving angle of the capturing unit, to trace the object detected from the first frame acquired in the acquiring step, is larger than a predetermined angle.

15. The method according to claim 14, further comprising a moving angle calculating step of obtaining the moving angle of the capturing unit during detection of the object from the second frame based on the moving angle of the capturing unit to trace the object detected from the first frame.

16. The method according to claim 15, further comprising a moving angle changing step of changing the moving angle obtained by the moving angle calculating step based on the object detected by the detecting step from the second frame.

17. The method according to claim 14, further comprising a moving start time calculating step of obtaining a moving start time of the moving step based on the moving angle to trace the object detected from the first frame.

* * * * *